United States Patent
Huang et al.

(10) Patent No.: US 10,104,578 B2
(45) Date of Patent: Oct. 16, 2018

(54) DATA TRANSMISSION METHOD AND DEVICE

(71) Applicant: Huawei Technologies Co., Ltd., Shenzhen, Guangdong (CN)

(72) Inventors: Min Huang, Shanghai (CN); Shu Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 15/389,234

(22) Filed: Dec. 22, 2016

(65) Prior Publication Data

US 2017/0105138 A1 Apr. 13, 2017

Related U.S. Application Data

(63) Continuation of application No. PCT/CN2014/080744, filed on Jun. 25, 2014.

(51) Int. Cl.
*H04L 12/56* (2006.01)
*H04W 28/04* (2009.01)
(Continued)

(52) U.S. Cl.
CPC ............ *H04W 28/04* (2013.01); *H04L 1/18* (2013.01); *H04L 47/27* (2013.01); *H04L 47/323* (2013.01);
(Continued)

(58) Field of Classification Search
CPC ........ H04W 28/04; H04W 80/06; H04L 1/18; H04L 69/163; H04L 47/323; H04L 47/27; H04L 47/14
See application file for complete search history.

(56) References Cited

U.S. PATENT DOCUMENTS

2003/0235206 A1\* 12/2003 Heller .................... H04L 47/10
370/467
2005/0068896 A1 3/2005 Pazos
(Continued)

FOREIGN PATENT DOCUMENTS

CN 101442481 A 5/2009
CN 101924625 A 12/2010
(Continued)

OTHER PUBLICATIONS

Ford, A., et al., "TCP Extensions for Multipath Operation with Multiple Addresses," Internet Engineering Task Force (IETF), Request for Comments: 6824,Category: Experimental, ISSN: 2070-1721, 64 pages.
(Continued)

*Primary Examiner* — Lakeram Jangbahadur

(57) ABSTRACT

Embodiments of the present invention relate to the field of communications technologies, and disclose a data transmission method and a device, to reduce a quantity of TCP-layer ACK packets transmitted on a radio air interface link between a first device and a second device, thereby reducing consumption of radio air interface link resources and improving transmission efficiency of radio service data. A specific solution is as follows: obtaining, by a first device, a TCP-layer ACK; and intercepting the TCP-layer ACK if a TCP-layer data packet corresponding to the TCP-layer ACK is a TCP-layer data packet that is obtained by the first device after the first device parses a link layer data packet received through a radio air interface link by the first device, and the TCP-layer ACK satisfies a preset condition. The present invention is applied to a data packet transmission process based on a TCP connection.

12 Claims, 14 Drawing Sheets

(51) Int. Cl.
*H04L 12/807* (2013.01)
*H04W 80/06* (2009.01)
*H04L 12/823* (2013.01)
*H04L 29/06* (2006.01)
*H04L 1/18* (2006.01)
*H04L 12/801* (2013.01)

(52) U.S. Cl.
CPC ........... *H04L 69/163* (2013.01); *H04W 80/06* (2013.01); *H04L 47/14* (2013.01)

(56) References Cited

U.S. PATENT DOCUMENTS

| | | | |
|---|---|---|---|
| 2006/0224753 A1 | 10/2006 | Hama et al. | |
| 2009/0290567 A1* | 11/2009 | Matsue | H04W 80/06 370/338 |
| 2011/0044338 A1* | 2/2011 | Stahl | H04L 1/1607 370/392 |
| 2014/0153583 A1 | 6/2014 | Gouache et al. | |
| 2014/0355442 A1 | 12/2014 | Isobe | |

FOREIGN PATENT DOCUMENTS

| | | |
|---|---|---|
| EP | 1959693 A1 | 2/2007 |
| JP | 2000295278 A | 10/2000 |
| JP | 2006114973 A | 4/2006 |
| JP | 2006279394 A | 10/2006 |
| JP | 2009284443 A | 12/2009 |
| JP | 2012134907 A | 7/2012 |
| JP | 2014110639 A | 6/2014 |
| WO | 2013125096 A1 | 8/2013 |

OTHER PUBLICATIONS

Kliazovich, Dzmitry, et al, "A Cross-layer Scheme for TCP Performance Improvement in Wireless LANs," Global Telecommunications Conference, 2004, Globecom '04, IEEE, Dallas, TX, Nov. 29-Dec. 3, 2004, Piscataway, NJ, IEEE, Piscataway, NJ, vol. 2, Nov. 29, 2004, pp. 840-844, XP010757643.

Kliazovich, Dzmitry, et al, "Cross-Layer Error Control Optimization in 3G LTE," Global Telecommunications Conference, 2007, Globecom '07, IEEE, Piscataway, NJ, Nov. 1, 2007, pp. 2525-2529, XP031196408.

* cited by examiner

|       | $(N-2)^{th}$ time | $(N-1)^{th}$ time | $N^{th}$ time |
|-------|-------------------|-------------------|---------------|
| Case 1 | 1　2　3 | 5　7 | 4　6 |
| Case 2 | 1　2　3 | 5　7 | 4　8 |

FIG. 8

DATA TRANSMISSION METHOD AND DEVICE

CROSS-REFERENCE TO RELATED APPLICATIONS

This application is a continuation of International Application No. PCT/CN2014/080744, filed on Jun. 25, 2014, the disclosure of which is hereby incorporated by reference in its entirety.

TECHNICAL FIELD

The present invention relates to the field of communications technologies, and in particular, to a data transmission method and a device.

BACKGROUND

The Transmission Control Protocol (TCP) is a reliable connection-oriented transmission protocol. The TCP may provide an acknowledgement mechanism in a TCP data transmission process. Specifically, after receiving a TCP data packet, a data packet receive end may reply to a data packet transmit end with an acknowledgement (ACK), to notify the data packet transmit end that the data packet receive end already receives the TCP data packet. Certainly, the data packet receive end may acknowledge multiple TCP data packets once. For example, after sequentially receiving a TCP data packet 1, a TCP data packet 2, and a TCP data packet 3 that have consecutive sequence numbers (SN), the data packet receive end needs to acknowledge only the TCP data packet 3.

In the prior art, a TCP connection between the data packet receive end and the data packet transmit end generally includes a TCP wireless connection and a TCP wired connection. As shown in FIG. 1, a TCP connection between a terminal and an application server may include a TCP wireless connection between the terminal and a radio access network (RAN) side device and a TCP wired connection between the RAN side device and the application server via a core network.

Based on the foregoing acknowledgement mechanism, after receiving a TCP data packet sent by a data packet transmit end, both a data packet receive end in the TCP wired connection and a data packet receive end in the TCP wireless connection need to reply to the data packet transmit end with an ACK. Using the TCP wireless connection in FIG. 1 as an example, in a downlink data transmission process, after receiving a TCP data packet sent by the RAN side device, the terminal needs to reply to the RAN side device with an ACK.

However, the following problem exists: In a TCP data transmission process in a live network, a data packet receive end replies to a data packet transmit end with a relatively large quantity of ACKs (according to statistics collection, in a TCP downlink data transmission process, 90% of uplink data is ACK), and transmission of a large quantity of ACKs in a TCP wireless connection may occupy radio air interface link resources, which increases consumption of the radio air interface link resources, and affects transmission efficiency of radio service data.

SUMMARY

Embodiments of the present invention provide a data transmission method and a device, to reduce a quantity of TCP-layer ACK packets transmitted on a radio air interface link, thereby reducing consumption of radio air interface link resources and improving transmission efficiency of radio service data.

A first aspect of the embodiments of the present invention provides a data transmission method, including:

obtaining, by a first device, a Transmission Control Protocol TCP-layer acknowledgement ACK; and intercepting the TCP-layer ACK if a TCP-layer data packet corresponding to the TCP-layer ACK is a TCP-layer data packet that is obtained by the first device after the first device parses a link layer data packet received through a radio air interface link by the first device, and the TCP-layer ACK satisfies a preset condition, where that the TCP-layer ACK satisfies the preset condition includes: the TCP-layer ACK does not satisfy at least one filter condition in a first filter criterion, and the TCP-layer ACK belongs to at least one of a first interception category or a second interception category.

With reference to the first aspect, in a possible implementation manner, the method further includes:

after receiving the link layer data packet from a second device through the radio air interface link, sending a link layer ACK to the second device, so that the second device determines, according to the link layer ACK, that the first device already receives the TCP-layer data packet.

With reference to the first aspect and the foregoing possible implementation manner, in another possible implementation manner, the method further includes:

if the TCP-layer data packet corresponding to the TCP-layer ACK is not the TCP-layer data packet that is obtained by the first device after the first device parses the link layer data packet received through the radio air interface link by the first device, sending the TCP-layer ACK to the second device; or if the TCP-layer data packet corresponding to the TCP-layer ACK is the TCP-layer data packet that is obtained by the first device after the first device parses the link layer data packet received through the radio air interface link by the first device, and the TCP-layer ACK does not satisfy the preset condition, sending the TCP-layer ACK to the second device.

With reference to the first aspect and the foregoing possible implementation manners, in another possible implementation manner, the first filter criterion includes at least: one of the following filter conditions or a combination of multiple filter conditions of the following filter conditions:

the TCP-layer ACK is an ACK that is carried, after the first device receives the link layer data packet, in another data packet sent to the second device and that is sent to the second device in a delaying manner;

the TCP-layer ACK is an ACK in which a SYN bit is not set to 1;

the TCP-layer ACK carries a TCP maximum segment size option, a TCP window scale option, and a TCP Sack-permitted option;

the TCP-layer ACK carries a TCP option related to the Multipath Transmission Control Protocol (MPTCP) protocol; and a receive window carried in the TCP-layer ACK is not less than a preset threshold.

With reference to the first aspect and the foregoing possible implementation manners, in another possible implementation manner, in the first interception category, a TCP-layer data packet corresponding to a sequence number of the TCP-layer ACK is not recorded in a buffer of TCP-layer data packets, and TCP-layer data packets corresponding to ACK sequence numbers before the sequence number of the TCP-layer ACK are all recorded in the buffer of the TCP-layer data packets; and in the second interception category, the sequence number of the TCP-layer ACK is equal to a first sequence number, and the first sequence number is updated once each time after a TCP-layer ACK is obtained but before the obtained TCP-layer ACK is intercepted.

With reference to the first aspect and the foregoing possible implementation manners, in another possible implementation manner, that the TCP-layer ACK satisfies the preset condition further includes: the TCP-layer ACK does not satisfy at least one filter condition in a second filter criterion, where the second filter criterion includes at least: one of the following filter conditions or a combination of multiple filter conditions of the following filter conditions:

the TCP-layer ACK carries a TCP timestamps option; and
the TCP-layer ACK carries a TCP Sack option.

With reference to the first aspect and the foregoing possible implementation manners, in another possible implementation manner, before the obtaining a Transmission Control Protocol TCP-layer acknowledgement ACK, the method further includes:

receiving first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK;

determining an ACK category intersection according to the first interception operation and a second ACK category, and determining an interception parameter intersection according to the first interception parameter and a second interception parameter, where the ACK category intersection is an intersection of the first ACK category and the second ACK category, the interception parameter intersection is an intersection of the first interception parameter and the second interception parameter, the second ACK category is an ACK category to which a TCP-layer ACK that is intercepted by the first device when the first device makes interception decision belongs, the second ACK category includes the first interception category and/or the second interception category, the second interception parameter is an interception parameter used when the first device makes interception decision, and the second interception parameter includes at least a preset threshold of the receive window carried in the TCP-layer ACK;

determining, according to the ACK category intersection, a category of ACK interception of which is supported by both the first device and the second device, and determining, according to the interception parameter intersection, an interception parameter that is supported by both the first device and the second device; and sending second capability negotiation signaling to the second device, where the second capability negotiation signaling includes the second ACK category and the second interception parameter, where the second capability negotiation signaling is used to instruct the second device to obtain the ACK category intersection and the interception parameter intersection, and to further determine, according to the ACK category intersection, the category of ACK interception of which is supported by both the first device and the second device, and determine, according to the interception parameter intersection, the interception parameter that is supported by both the first device and the second device.

With reference to the first aspect and the foregoing possible implementation manners, in another possible implementation manner, before the obtaining a Transmission Control Protocol TCP-layer acknowledgement ACK, the method further includes:

receiving first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK; and determining, according to the first interception operation, a category of ACK interception of which is supported by the first device, and determining, according to the first interception parameter, an interception parameter that is supported by the first device.

With reference to the first aspect and the foregoing possible implementation manners, in another possible implementation manner, the first device is user equipment and the second device is a radio access network RAN side device, or the first device is a RAN side device and the second device is user equipment.

A second aspect of the embodiments of the present invention provides a data transmission method, including:

receiving, by a second device, a link layer acknowledgement ACK from a first device, where the link layer ACK is sent by the first device after the first device receives a link layer data packet sent by the second device; and determining, according to the link layer ACK, that the first device already receives a TCP-layer data packet, where the TCP-layer data packet is obtained by the first device after the first device parses the link layer data packet.

With reference to the second aspect, in a possible implementation manner, before the receiving, by a second device, a link layer ACK from a first device, the method further includes:

obtaining a mapping relationship between the TCP-layer data packet and the link layer data packet, where the mapping relationship between the TCP-layer data packet and the link layer data packet includes at least: a mapping relationship between a sequence number of the TCP-layer data packet and a sequence number of the link layer data packet.

With reference to the second aspect and the foregoing possible implementation manner, in another possible implementation manner, the link layer ACK includes a sequence number of the link layer data packet corresponding to the link layer ACK; and the determining, according to the link layer ACK, that the first device already receives a TCP-layer data packet includes:

determining, according to the sequence number of the link layer data packet and the mapping relationship between the sequence number of the TCP-layer data packet and the sequence number of the link layer data packet, a sequence number of the TCP-layer data packet corresponding to the link layer data packet successfully received by the first device, where the sequence number of the TCP-layer data packet corresponding to the link layer data packet successfully received by the first device is a sequence number of the TCP-layer data packet successfully received by the first device.

With reference to the second aspect and the foregoing possible implementation manners, in another possible implementation manner, the first device is user equipment and the second device is a radio access network RAN side device; and after the determining a sequence number of the TCP-layer data packet corresponding to the link layer data packet successfully received by the first device, the method further includes:

constructing a TCP-layer ACK according to the sequence number of the TCP-layer data packet successfully received by the first device, where a sequence number of the TCP-layer ACK is a sum of a sequence number of a continuity-acknowledged data packet and a packet length of the continuity-acknowledged data packet, the TCP-layer ACK is used to indicate to an application server that the first device already receives the TCP-layer data packet, and the link layer data packet is obtained by the second device after the second device encapsulates a TCP layer data packet received from the application server, and the continuity-acknowledged data packet is a TCP-layer data packet having a largest sequence number in consecutive TCP-layer data packets arranged in ascending order of sequence numbers in all TCP-layer data packets that are already determined by the second device and that are successfully received by the first device.

With reference to the second aspect and the foregoing possible implementation manners, in another possible implementation manner, before the determining, according to the link layer ACK, that the first device already receives a TCP-layer data packet, the method further includes:

receiving second capability negotiation signaling from the first device, where the second capability negotiation signaling includes a second ACK category and a second interception parameter, a second ACK category includes a first interception category and/or a second interception category, and the second interception parameter includes at least a preset threshold of a receive window carried in a first ACK;

determining an ACK category intersection according to the second ACK category and a first interception operation, and determining an interception parameter intersection according to the second interception parameter and a first interception parameter, where the first interception operation is operation processing corresponding to the first ACK category, the first ACK category includes the first interception category and/or the second interception category, the ACK category intersection is an intersection of the first ACK category and the second ACK category, the interception parameter intersection is an intersection of the first interception parameter and the second interception parameter, and the first interception parameter includes at least a preset threshold of a receive window carried in the TCP-layer ACK;

determining, according to the ACK category intersection, a category of ACK interception of which is supported by both the first device and the second device, and determining, according to the interception parameter intersection, an interception parameter that is supported by both the first device and the second device; and sending first capability negotiation signaling to the first device, where the first capability negotiation signaling includes the first interception operation and the first interception parameter, where the first capability negotiation signaling is used to instruct the first device to obtain the ACK category intersection and the interception parameter intersection, and to further determine, according to the ACK category intersection, the category of ACK interception of which is supported by both the first device and the second device, and determine, according to the interception parameter intersection, the interception parameter that is supported by both the first device and the second device.

With reference to the second aspect and the foregoing possible implementation manners, in another possible implementation manner, before the determining, according to the link layer ACK, that the first device already receives a TCP-layer data packet, the method further includes:

sending first capability negotiation signaling to the first device, where the first capability negotiation signaling includes a first interception operation and a first interception parameter, the first interception operation is operation processing corresponding to a first ACK category, the first ACK category includes a first interception category and/or a second interception category, and the first interception parameter includes at least a preset threshold of a receive window carried in a TCP-layer ACK; and determining, according to the first ACK category, a category of ACK interception of which is supported by the second device, and determining, according to the first interception parameter, an interception parameter that is supported by the second device, where the first capability negotiation signaling is used to instruct the first device to determine, according to the first ACK category, a category of ACK interception of which is supported by the first device, and determine, according to the first interception parameter, an interception parameter that is supported by the first device.

With reference to the second aspect and the foregoing possible implementation manners, in another possible implementation manner, the first device is user equipment and the second device is a RAN side device, or the first device is a RAN side device and the second device is user equipment.

A third aspect of the embodiments of the present invention provides a device, including:

an obtaining unit, configured to obtain a Transmission Control Protocol TCP-layer acknowledgement ACK; and an interception unit, configured to intercept the TCP-layer ACK if a TCP-layer data packet corresponding to the TCP-layer ACK obtained by the obtaining unit is a TCP-layer data packet that is obtained by the device after the device parses a link layer data packet received through a radio air interface link by the device, and the TCP-layer ACK satisfies a preset condition, where that the TCP-layer ACK satisfies the preset condition includes: the TCP-layer ACK does not satisfy at least one filter condition in a first filter criterion, and the TCP-layer ACK belongs to at least one of a first interception category or a second interception category.

With reference to the third aspect, in a possible implementation manner, the device further includes:

a receiving unit, configured to receive the link layer data packet from a second device through the radio air interface link; and a sending unit, configured to: after the receiving unit receives the link layer data packet from the second device through the radio air interface link, send a link layer ACK to the second device, so that the second device determines, according to the link layer ACK, that the device already receives the TCP-layer data packet.

With reference to the third aspect and the foregoing possible implementation manner, in another possible implementation manner, the device further includes a sending unit, where the sending unit is configured to: if the TCP-layer data packet corresponding to the TCP-layer ACK obtained by the obtaining unit is not the TCP-layer data packet that is obtained by the device after the device parses the link layer data packet received through the radio air interface link by the device, send the TCP-layer ACK to the second device; or the sending unit is configured to: if the TCP-layer data packet corresponding to the TCP-layer ACK is the TCP-layer data packet that is obtained by the device after the device parses the link layer data packet received through the radio air interface link by the device, and the TCP-layer ACK does not satisfy the preset condition, send the TCP-layer ACK to the second device.

With reference to the third aspect and the foregoing possible implementation manners, in another possible implementation manner, the first filter criterion includes at least: one of the following filter conditions or a combination of multiple filter conditions of the following filter conditions:

the TCP-layer ACK is an ACK that is carried, after the device receives a link layer data packet, in another data packet sent to the second device and that is sent to the second device in a delaying manner;

the TCP-layer ACK is an ACK in which a SYN bit is not set to 1;

the TCP-layer ACK carries a TCP maximum segment size option, a TCP window scale option, and a TCP Sack-permitted option;

the TCP-layer ACK carries a TCP option related to the MPTCP protocol; and a receive window carried in the TCP-layer ACK is not less than a preset threshold.

With reference to the third aspect and the foregoing possible implementation manners, in another possible implementation manner, in the first interception category, a TCP-layer data packet corresponding to a sequence number of the TCP-layer ACK is not recorded in a buffer of TCP-layer data packets, and TCP-layer data packets corresponding to ACK sequence numbers before the sequence number of the TCP-layer ACK are all recorded in the buffer of the TCP-layer data packets; and in the second interception category, the sequence number of the TCP-layer ACK is equal to a first sequence number, and the first sequence number is updated once each time after a TCP-layer ACK is obtained but before the obtained TCP-layer ACK is intercepted.

With reference to the third aspect and the foregoing possible implementation manners, in another possible implementation manner, that the TCP-layer ACK satisfies the preset condition further includes: the TCP-layer ACK does not satisfy at least one filter condition in a second filter criterion, where the second filter criterion includes at least: one of the following filter conditions or a combination of multiple filter conditions of the following filter conditions:

the TCP-layer ACK carries a TCP timestamps option; and
the TCP-layer ACK carries a TCP Sack option.

With reference to the third aspect and the foregoing possible implementation manners, in another possible implementation manner, the device further includes:

a receiving unit, configured to: before the obtaining unit obtains the TCP-layer ACK, receive first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK;

a first determining unit, configured to: determine an ACK category intersection according to the first interception operation received by the receiving unit and a second ACK category, and determine an interception parameter intersection according to the first interception parameter and a second interception parameter, where the ACK category intersection is an intersection of the first ACK category and the second ACK category, the interception parameter intersection is an intersection of the first interception parameter and the second interception parameter, the second ACK category is an ACK category to which a TCP-layer ACK that is intercepted by the device when the device makes interception decision belongs, the second ACK category includes the first interception category and/or the second interception category, the second interception parameter is an interception parameter used when the device makes interception decision, and the second interception parameter includes at least a preset threshold of the receive window carried in the TCP-layer ACK;

a second determining unit, configured to determine, according to the ACK category intersection determined by the first determining unit, a category of ACK interception of which is supported by both the device and the second device, and determine, according to the interception parameter intersection determined by the first determining unit, an interception parameter that is supported by both the device and the second device; and a sending unit, configured to send second capability negotiation signaling to the second device, where the second capability negotiation signaling includes the second ACK category and the second interception parameter, where the second capability negotiation signaling is used to instruct the second device to obtain the ACK category intersection and the interception parameter intersection, and to further determine, according to the ACK category intersection, the category of ACK interception of which is supported by both the device and the second device, and determine, according to the interception parameter intersection, the interception parameter that is supported by both the device and the second device.

With reference to the third aspect and the foregoing possible implementation manners, in another possible implementation manner, the device further includes:

a receiving unit, configured to: before the obtaining unit obtains the TCP-layer ACK, receive first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK; and a third determining unit, configured to: determine, according to the first interception operation received by the receiving unit, a category of ACK interception of which is supported by the device, and determine, according to the first interception parameter received by the receiving unit, an interception parameter that is supported by the device.

With reference to the third aspect and the foregoing possible implementation manners, in another possible implementation manner, the device is user equipment and the second device is a radio access network RAN side device, or the device is a RAN side device and the second device is user equipment.

A fourth aspect of the embodiments of the present invention provides a device, including:

a receiving unit, configured to receive a link layer acknowledgement ACK from a first device, where the link layer ACK is sent by the first device after the first device receives a link layer data packet sent by the device; and a first determining unit, configured to determine, according to the link layer ACK received by the receiving unit, that the first device already receives a TCP-layer data packet, where the TCP-layer data packet is obtained by the first device after the first device parses the link layer data packet.

With reference to the fourth aspect, in a possible implementation manner, the device further includes:

an obtaining unit, configured to: before the receiving unit receives the link layer ACK from the first device, obtain a mapping relationship between the TCP-layer data packet and the link layer data packet, where the mapping relationship between the TCP-layer data packet and the link layer data packet includes at least: a mapping relationship between a sequence number of the TCP-layer data packet and a sequence number of the link layer data packet.

With reference to the fourth aspect and the foregoing possible implementation manner, in another possible implementation manner, the link layer ACK includes a sequence number of the link layer data packet corresponding to the link layer ACK; and the first determining unit is further configured to determine, according to the sequence number of the link layer data packet and the mapping relationship between the sequence number of the TCP-layer data packet and the sequence number of the link layer data packet, a sequence number of the TCP-layer data packet corresponding to the link layer data packet successfully received by the first device, where the sequence number of the TCP-layer data packet corresponding to the link layer data packet successfully received by the first device is a sequence number of the TCP-layer data packet successfully received by the first device.

With reference to the fourth aspect and the foregoing possible implementation manners, in another possible implementation manner, the first device is user equipment and the device is a radio access network RAN side device; and the device further includes:

a construction unit, configured to: after the first determining unit determines the sequence number of the TCP-layer data packet corresponding to the link layer data packet successfully received by the first device, construct a TCP-layer ACK according to the sequence number of the TCP-layer data packet successfully received by the first device, where a sequence number of the TCP-layer ACK is a sum of a sequence number of a continuity-acknowledged data packet and a packet length of the continuity-acknowledged data packet, the TCP-layer ACK is used to indicate to an application server that the first device already receives the TCP-layer data packet, and the link layer data packet is obtained by the device after the device encapsulates a TCP layer data packet received from the application server, and the continuity-acknowledged data packet is a TCP-layer data packet having a largest sequence number in consecutive TCP-layer data packets arranged in ascending order of sequence numbers in all TCP-layer data packets that are already determined by the device and that are successfully received by the first device.

With reference to the fourth aspect and the foregoing possible implementation manners, in another possible implementation manner, the receiving unit is further configured to: before the first determining unit determines, according to the link layer ACK, that the first device already receives the TCP-layer data packet, receive second capability negotiation signaling from the first device, where the second capability negotiation signaling includes a second ACK category and a second interception parameter, a second ACK category includes a first interception category and/or a second interception category, and the second interception parameter includes at least a preset threshold of a receive window carried in a first ACK; and the device further includes:

a second determining unit, configured to: determine an ACK category intersection according to the second ACK category received by the receiving unit and a first interception operation, and determine an interception parameter intersection according to the second interception parameter received by the receiving unit and a first interception parameter, where the first interception operation is operation processing corresponding to the first ACK category, the first ACK category includes the first interception category and/or the second interception category, the ACK category intersection is an intersection of the first ACK category and the second ACK category, the interception parameter intersection is an intersection of the first interception parameter and the second interception parameter, and the first interception parameter includes at least a preset threshold of a receive window carried in the TCP-layer ACK;

a third determining unit, configured to: determine, according to the ACK category intersection determined by the second determining unit, a category of ACK interception of which is supported by both the first device and the device, and determine, according to the interception parameter intersection determined by the second determining unit, an interception parameter that is supported by the first device and the device; and a sending unit, configured to send first capability negotiation signaling to the first device, where the first capability negotiation signaling includes the first interception operation and the first interception parameter, where the first capability negotiation signaling is used to instruct the first device to obtain the ACK category intersection and the interception parameter intersection, and to further determine, according to the ACK category intersection, the category of ACK interception of which is supported by both the first device and the device, and determine, according to the interception parameter intersection, the interception parameter that is supported by both the first device and the device.

With reference to the fourth aspect and the foregoing possible implementation manners, in another possible implementation manner, the device further includes:

a sending unit, configured to: before the first determining unit determines, according to the link layer ACK, that the first device already receives the TCP-layer data packet, send first capability negotiation signaling to the first device, where the first capability negotiation signaling includes a first interception operation and a first interception parameter, the first interception operation is operation processing corresponding to a first ACK category, the first ACK category includes a first interception category and/or a second interception category, and the first interception parameter includes at least a preset threshold of a receive window carried in a TCP-layer ACK; and a fourth determining unit, configured to determine, according to the first ACK category, a category of ACK interception of which is supported by the device, and determine, according to the first interception parameter, an interception parameter that is supported by the device, where the first capability negotiation signaling is used to instruct the first device to determine, according to the first ACK category, a category of ACK interception of which is supported by the first device, and determine, according to the first interception parameter, an interception parameter that is supported by the first device.

With reference to the fourth aspect and the foregoing possible implementation manners, in another possible implementation manner, the first device is user equipment and the device is a RAN side device, or the first device is a RAN side device and the device is user equipment.

A fifth aspect of the embodiments of the present invention provides a device, including:

a processor, configured to: obtain a Transmission Control Protocol TCP-layer acknowledgement ACK; and intercept the TCP-layer ACK if a TCP-layer data packet corresponding to the TCP-layer ACK is a TCP-layer data packet that is obtained by the device after the device parses a link layer data packet received through a radio air interface link by the device, and the TCP-layer ACK satisfies a preset condition, where that the TCP-layer ACK satisfies the preset condition includes: the TCP-layer ACK does not satisfy at least one filter condition in a first filter criterion, and the TCP-layer ACK belongs to at least one of a first interception category or a second interception category.

With reference to the fifth aspect, in a possible implementation manner, the device further includes:

a receiver, configured to receive the link layer data packet from a second device through the radio air interface link; and a transmitter, configured to: after the receiver receives the link layer data packet from the second device through the radio air interface link, send a link layer ACK to the second device, so that the second device determines, according to the link layer ACK, that the device already receives the TCP-layer data packet.

With reference to the fifth aspect and the foregoing possible implementation manner, in another possible implementation manner, the transmitter is further configured to: if the TCP-layer data packet corresponding to the TCP-layer ACK is not the TCP-layer data packet that is obtained by the device after the device parses the link layer data packet received through the radio air interface link by the device, send the TCP-layer ACK to the second device; or the transmitter is further configured to: if the TCP-layer data packet corresponding to the TCP-layer ACK is the TCP-layer data packet that is obtained by the device after the device parses the link layer data packet received through the radio air interface link by the device, and the TCP-layer ACK does not satisfy the preset condition, send the TCP-layer ACK to the second device.

With reference to the fifth aspect and the foregoing possible implementation manners, in another possible implementation manner, the first filter criterion includes at least: one of the following filter conditions or a combination of multiple filter conditions of the following filter conditions:

the TCP-layer ACK is an ACK that is carried, after the device receives a link layer data packet, in another data packet sent to the second device and that is sent to the second device in a delaying manner;

the TCP-layer ACK is an ACK in which a SYN bit is not set to 1;

the TCP-layer ACK carries a TCP maximum segment size option, a TCP window scale option, and a TCP Sack-permitted option;

the TCP-layer ACK carries a TCP option related to the MPTCP protocol; and a receive window carried in the TCP-layer ACK is not less than a preset threshold.

With reference to the fifth aspect and the foregoing possible implementation manners, in another possible implementation manner, in the first interception category, a TCP-layer data packet corresponding to a sequence number of the TCP-layer ACK is not recorded in a buffer of TCP-layer data packets, and TCP-layer data packets corresponding to ACK sequence numbers before the sequence number of the TCP-layer ACK are all recorded in the buffer of the TCP-layer data packets; and in the second interception category, the sequence number of the TCP-layer ACK is equal to a first sequence number, and the first sequence number is updated once each time after a TCP-layer ACK is obtained but before the obtained TCP-layer ACK is intercepted.

With reference to the fifth aspect and the foregoing possible implementation manners, in another possible implementation manner, that the TCP-layer ACK satisfies the preset condition further includes: the TCP-layer ACK does not satisfy at least one filter condition in a second filter criterion, where the second filter criterion includes at least: one of the following filter conditions or a combination of multiple filter conditions of the following filter conditions:

the TCP-layer ACK carries a TCP timestamps option; and the TCP-layer ACK carries a TCP Sack option.

With reference to the fifth aspect and the foregoing possible implementation manners, in another possible implementation manner, the receiver is further configured to: before the processor obtains the Transmission Control Protocol TCP-layer acknowledgement ACK, receive first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK; and the processor is further configured to: determine an ACK category intersection according to the first interception operation and a second ACK category, and determine an interception parameter intersection according to the first interception parameter and a second interception parameter, where the ACK category intersection is an intersection of the first ACK category and the second ACK category, the interception parameter intersection is an intersection of the first interception parameter and the second interception parameter, the second ACK category is an ACK category to which a TCP-layer ACK that is intercepted by the device when the device makes interception decision belongs, the second ACK category includes the first interception category and/or the second interception category, the second interception parameter is an interception parameter used when the device makes interception decision, and the second interception parameter includes at least a preset threshold of the receive window carried in the TCP-layer ACK; and determine, according to the ACK category intersection, a category of ACK interception of which is supported by both the device and the second device, and determine, according to the interception parameter intersection, an interception parameter that is supported by both the device and the second device; and the transmitter is further configured to send second capability negotiation signaling to the second device, where the second capability negotiation signaling includes the second ACK category and the second interception parameter, where the second capability negotiation signaling is used to instruct the second device to obtain the ACK category intersection and the interception parameter intersection, and to further determine, according to the ACK category intersection, the category of ACK interception of which is supported by both the device and the second device, and determine, according to the interception parameter intersection, the interception parameter that is supported by both the device and the second device.

With reference to the fifth aspect and the foregoing possible implementation manners, in another possible implementation manner, the receiver is further configured to: before the processor obtains the Transmission Control Protocol TCP-layer acknowledgement ACK, receive first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK; and the processor is further configured to determine, according to the first interception operation received by the receiver, a category of ACK interception of which is supported by the device, and determine, according to the first interception parameter, an interception parameter that is supported by the device.

With reference to the fifth aspect and the foregoing possible implementation manners, in another possible implementation manner, the device is user equipment and the second device is a radio access network RAN side device, or the device is a RAN side device and the second device is user equipment.

A sixth aspect of the embodiments of the present invention provides a device, including:

a receiver, configured to receive a link layer acknowledgement ACK from a first device, where the link layer ACK is sent by the first device after the first device receives a link layer data packet sent by the device; and a processor, configured to determine, according to the link layer ACK received by the receiver, that the first device already receives a TCP-layer data packet, where the TCP-layer data packet is obtained by the first device after the first device parses the link layer data packet.

With reference to the sixth aspect, in a possible implementation manner, the processor is further configured to: before the receiver receives the link layer ACK from the first device, obtain a mapping relationship between the TCP-layer data packet and the link layer data packet, where the mapping relationship between the TCP-layer data packet and the link layer data packet includes at least: a mapping relationship between a sequence number of the TCP-layer data packet and a sequence number of the link layer data packet.

With reference to the sixth aspect and the foregoing possible implementation manner, in another possible implementation manner, the link layer ACK includes a sequence number of the link layer data packet corresponding to the link layer ACK; and the processor is further configured to determine, according to the sequence number of the link layer data packet and the mapping relationship between the sequence number of the TCP-layer data packet and the sequence number of the link layer data packet, a sequence number of the TCP-layer data packet corresponding to the link layer data packet successfully received by the first device, where the sequence number of the TCP-layer data packet corresponding to the link layer data packet successfully received by the first device is a sequence number of the TCP-layer data packet successfully received by the first device.

With reference to the sixth aspect and the foregoing possible implementation manners, in another possible implementation manner, the first device is user equipment and the device is a radio access network RAN side device; and the processor is further configured to: after determining the sequence number of the TCP-layer data packet corresponding to the link layer data packet successfully received by the first device, construct a TCP-layer ACK according to the sequence number of the TCP-layer data packet successfully received by the first device, where a sequence number of the TCP-layer ACK is a sum of a sequence number of a continuity-acknowledged data packet and a packet length of the continuity-acknowledged data packet, the TCP-layer ACK is used to indicate to an application server that the first device already receives the TCP-layer data packet, and the link layer data packet is obtained by the device after the device encapsulates a TCP layer data packet received from the application server, and the continuity-acknowledged data packet is a TCP-layer data packet having a largest sequence number in consecutive TCP-layer data packets arranged in ascending order of sequence numbers in all TCP-layer data packets that are already determined by the device and that are successfully received by the first device.

With reference to the sixth aspect and the foregoing possible implementation manners, in another possible implementation manner, the receiver is further configured to: before the processor determines, according to the link layer ACK, that the first device already receives the TCP-layer data packet, receive second capability negotiation signaling from the first device, where the second capability negotiation signaling includes a second ACK category and a second interception parameter, a second ACK category includes a first interception category and/or a second interception category, and the second interception parameter includes at least a preset threshold of a receive window carried in a first ACK;

the processor is further configured to: determine an ACK category intersection according to the second ACK category received by the receiver and a first interception operation, and determine an interception parameter intersection according to the second interception parameter received by the receiver and a first interception parameter, where the first interception operation is operation processing corresponding to the first ACK category, the first ACK category includes the first interception category and/or the second interception category, the ACK category intersection is an intersection of the first ACK category and the second ACK category, the interception parameter intersection is an intersection of the first interception parameter and the second interception parameter, and the first interception parameter includes at least a preset threshold of a receive window carried in the TCP-layer ACK; and determine, according to the ACK category intersection, a category of ACK interception of which is supported by both the first device and the device, and determine, according to the interception parameter intersection, an interception parameter that is supported by both the first device and the device; and the device further includes:

a transmitter, configured to send first capability negotiation signaling to the first device, where the first capability negotiation signaling includes the first interception operation and the first interception parameter, where the first capability negotiation signaling is used to instruct the first device to obtain the ACK category intersection and the interception parameter intersection, and to further determine, according to the ACK category intersection, the category of ACK interception of which is supported by both the first device and the device, and determine, according to the interception parameter intersection, the interception parameter that is supported by both the first device and the device.

With reference to the sixth aspect and the foregoing possible implementation manners, in another possible implementation manner, the transmitter is further configured to: before the processor determines, according to the link layer ACK, that the first device already receives the TCP-layer data packet, send first capability negotiation signaling to the first device, where the first capability negotiation signaling includes a first interception operation and a first interception parameter, the first interception operation is operation processing corresponding to a first ACK category, the first ACK category includes a first interception category and/or a second interception category, and the first interception parameter includes at least a preset threshold of a receive window carried in a TCP-layer ACK; and the processor is further configured to determine, according to the first ACK category, a category of ACK interception of which is supported by the device, and determine, according to the first interception parameter, an interception parameter that is supported by the device, where the first capability negotiation signaling is used to instruct the first device to determine, according to the first ACK category, a category of ACK interception of which is supported by the first device, and determine, according to the first interception parameter, an interception parameter that is supported by the first device.

With reference to the sixth aspect and the foregoing possible implementation manners, in another possible implementation manner, the first device is user equipment and the device is a RAN side device, or the first device is a RAN side device and the device is user equipment.

In the data transmission method and the device that are provided in the embodiments of the present invention, a first device obtains a TCP-layer ACK; and intercepts the TCP-layer ACK if a TCP-layer data packet corresponding to the TCP-layer ACK is a TCP-layer data packet that is obtained by the first device after the first device parses a link layer data packet received through a radio air interface link by the first device, and the TCP-layer ACK satisfies a preset condition.

Compared with the prior art that a large amount of TCP-layer ACK packet transmission occupies radio air interface link resources and increases consumption of radio air interface link resources, in this solution, the first device may perform interception decision on the TCP-layer ACK, and when the TCP-layer ACK satisfies the preset condition, intercept the TCP-layer ACK, that is, does not send the TCP-layer ACK to a second device; the second device may determine, according to a link layer ACK received from the first device, that the first device already receives the TCP-layer data packet. Therefore, a quantity of TCP-layer ACK packets transmitted on the radio air interface link between the first device and the second device can be reduced without affecting a TCP acknowledgement mechanism between the first device and the second device, thereby reducing consumption of radio air interface link resources, improving transmission efficiency of radio service data, and improving a capacity of a radio communications system.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 8 is a schematic diagram of another data packet transmission process according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Various technologies described in this specification may be applied to various wireless communications systems, for example, current 2G and 3G communications systems and next-generation communications system, for example, Global System for Mobile Communications (GSM), Code Division Multiple Access (CDMA) system, Time Division Multiple Access (TDMA) system, Wideband Code Division Multiple Access (WCDMA) system, Frequency Division Multiple Access (FDMA) system, Orthogonal Frequency-Division Multiple Access (OFDMA) system, single-carrier FDMA (SC-FDMA) system, general packet radio service (GPRS) system, Long Term Evolution (LTE) system, and other communications systems.

Various aspects of this specification are described with reference to a terminal and/or a base station and/or a base station controller.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

Figure 1:
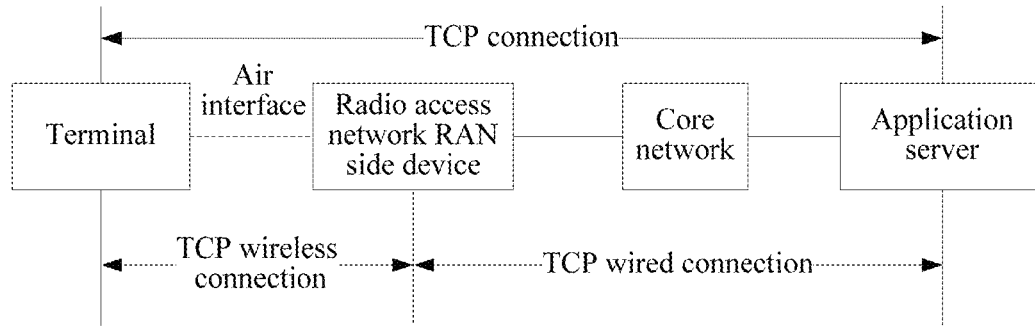
FIG. 1 is a schematic diagram of a TCP connection crossing a wired network and a wireless network in the background of the present invention.
Figure 2:
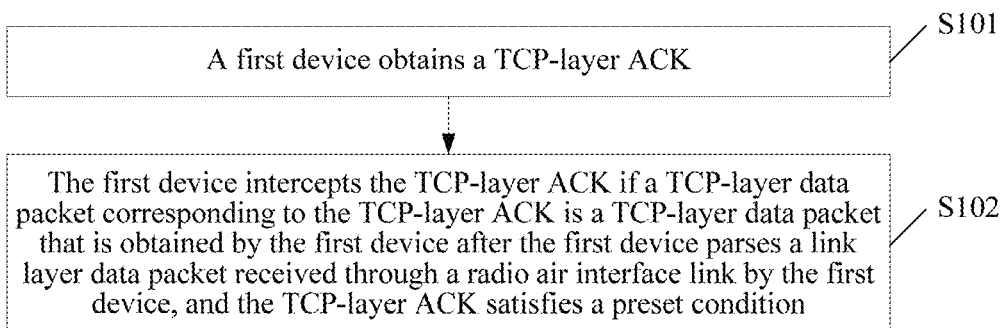
FIG. 2 is a flowchart of a data transmission method according to Embodiment 1 of the present invention.

This embodiment of the present invention provides a data transmission method, which may be applied to a first device. This embodiment may be applied to a process in which the first device and a second device perform uplink data transmission or downlink data transmission. As shown in FIG. 2, the data transmission method includes:

S101: The first device obtains a Transmission Control Protocol (Transmission Control Protocol, TCP)-layer acknowledgement (ACK).

In one aspect, in a downlink data transmission scenario based on a TCP connection, the first device is user equipment and the second device is a radio access network (RAN) side device. The RAN side device may be any device on a RAN, for example, a base station or a controller.

In a downlink data transmission process based on a TCP connection, the RAN side device (the second device) may receive a TCP-layer data packet from an application server, encapsulate the TCP-layer data packet to obtain a link layer data packet, and then, send the link layer data packet to the user equipment (the first device); after receiving the link layer data packet, the user equipment (the first device) may parse the link layer data packet to obtain the corresponding TCP-layer data packet, and then, generate acknowledgement information, that is, a TCP-layer ACK, of the TCP-layer data packet according to the TCP-layer data packet.

In another aspect, in an uplink data transmission scenario based on a TCP connection, the first device is a RAN side device and the second device is user equipment.

In the uplink data transmission scenario, after obtaining a TCP-layer data packet, the user equipment (the second device) may encapsulate the TCP-layer data packet to obtain a link layer data packet, and then, send the link layer data packet to the RAN side device (the first device); after receiving the link layer data packet from the user equipment (the second device), the RAN side device (the first device) may parse the link layer data packet to obtain the corresponding TCP-layer data packet, then, send the TCP-layer data packet obtained through parsing to an application server, and receive a TCP-layer ACK from the application server.

It should be noted that after obtaining the TCP-layer ACK, the first device (the user equipment in the downlink data transmission scenario or the RAN side device in the uplink data transmission scenario) may perform interception decision on the TCP-layer ACK; when the TCP-layer data packet corresponding to the obtained TCP-layer ACK is a TCP-layer data packet that is obtained by the first device after the first device parses a link layer data packet received through a radio air interface link by the first device, and the TCP-layer ACK satisfies a preset condition, the first device intercepts the TCP-layer ACK, that is, performs S102; when the TCP-layer data packet corresponding to the obtained TCP-layer ACK is not the TCP-layer data packet that is obtained by the first device after the first device parses the link layer data packet received through the radio air interface link by the first device, the first device sends the TCP-layer ACK to the second device; and when the TCP-layer data packet corresponding to the obtained TCP-layer ACK is the TCP-layer data packet that is obtained by the first device after the first device parses the link layer data packet received through the radio air interface link by the first device, and the TCP-layer ACK does not satisfy the preset condition, the first device sends the TCP-layer ACK to the second device.

S102: The first device intercepts the TCP-layer ACK if a TCP-layer data packet corresponding to the TCP-layer ACK is a TCP-layer data packet that is obtained by the first device after the first device parses a link layer data packet received through a radio air interface link by the first device, and the TCP-layer ACK satisfies a preset condition.

It should be noted that, to reduce a quantity of TCP-layer ACK packets on the radio air interface link, the first device may perform interception decision on the TCP-layer ACK.

Exemplarily, that the TCP-layer ACK satisfies the preset condition specifically includes: the TCP-layer data packet corresponding to the TCP-layer ACK is a TCP-layer data packet received through the radio air interface link, the TCP-layer ACK does not satisfy at least one filter condition in a first filter criterion, and the TCP-layer ACK belongs to a first interception category and/or a second interception category; or the TCP-layer data packet corresponding to the TCP-layer ACK is a TCP-layer data packet received through the radio air interface link, the TCP-layer ACK does not satisfy at least one filter condition in a first filter criterion, the TCP-layer ACK does not satisfy at least one filter condition in a second filter criterion, and the TCP-layer ACK belongs to a first interception category and/or a second interception category.

Exemplarily, the first filter criterion includes at least: one of the following filter conditions or a combination of multiple filter conditions of the following filter conditions: 1) the TCP-layer ACK is an ACK that is carried, after the first device receives the link layer data packet, another data packet sent to the second device and that is sent to the second device in a delaying manner; 2) the TCP-layer ACK is an ACK in which a SYN bit is not set to 1; 3) the TCP-layer ACK carries a TCP maximum segment size option, a TCP window scale option, and a TCP Sack-permitted option; 4) the TCP-layer ACK carries a TCP option related to the MPTCP protocol; and 5) a receive window carried in the TCP-layer ACK is not less than a preset threshold.

The filter conditions in the second filter criterion include at least: 1) the TCP-layer ACK carries a TCP timestamps option; and 2) the TCP-layer ACK carries a TCP Sack option.

In the first interception category, a TCP-layer data packet corresponding to a sequence number of the TCP-layer ACK is not recorded in a buffer of TCP-layer data packets, and TCP-layer data packets corresponding to ACK sequence numbers before the sequence number of the TCP-layer ACK are all recorded in the buffer of the TCP-layer data packets.

In the second interception category, the sequence number of the TCP-layer ACK is a first sequence number, the first sequence number is a sequence number of a TCP-layer ACK that is reserved each time after the first device obtains the TCP-layer ACK but before the first device intercepts the obtained TCP-layer ACK, and the first sequence number is updated once each time after the TCP-layer ACK is obtained but before the obtained TCP-layer ACK is not intercepted.

In one application scenario of this embodiment of the present invention, the radio air interface link between the first device and the second device may be a $3^{rd}$ generation partnership project (3GPP) link, and data is transmitted between the first device and the second device by means of a 3GPP air interface. In a data transmission process based on a TCP connection, the first device may include a processing entity of a TCP IP protocol stack and a processing entity of a 3GPP air interface protocol stack.

In one case of this application scenario, an interception module may be deployed on a TCP layer or an IP layer of the processing entity of the TCP IP protocol stack.

In another case of this application scenario, an interception module may be deployed on a protocol layer, which is the first to process air interface uplink data, of the processing entity of the 3GPP air interface protocol stack, for example, Packet Data Convergence Protocol (PDCP) layers on an LTE network and a UMTS network.

In another application scenario of this embodiment of the present invention, the radio air interface link between the first device and the second device may be a WiFi link, and data is transmitted between the first device and the second device by means of a WiFi air interface. In a data transmission process based on a TCP connection, the first device may include a processing entity of a TCP IP protocol stack and a processing entity of a WiFi air interface protocol stack.

In one case of this application scenario, an interception module may be deployed on a TCP layer or an IP layer of the processing entity of the TCP IP protocol stack.

In another case of this application scenario, an interception module may be deployed on a protocol layer, which is the first to process air interface uplink data, of the processing entity of the WiFi air interface protocol stack, that is, a Media Access Control (MAC) layer.

Further, in another application scenario of this embodiment of the present invention, a function of intercepting a TCP-layer ACK may be added to the first device by means of a packet capturing mechanism provided by an operating system, to implement interception decision on the TCP-layer ACK. In this application scenario, an original protocol stack may not be changed.

Figure 10:
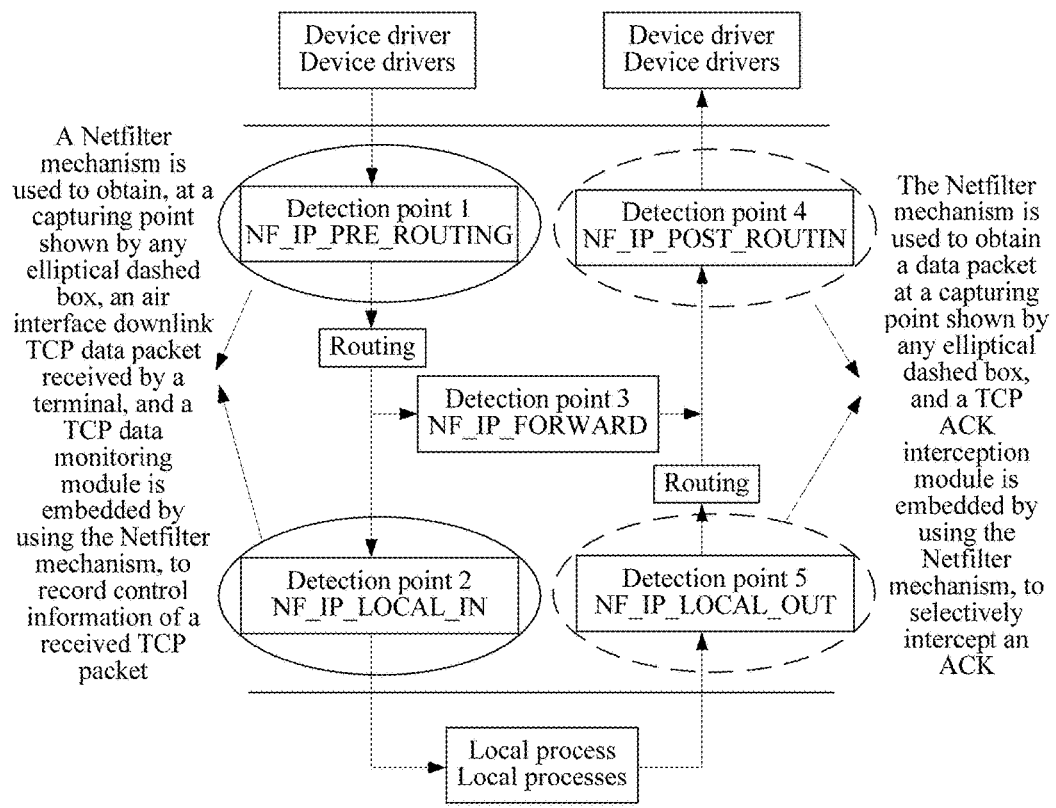
FIG. 10 is a schematic diagram of a Netfilter mechanism according to an embodiment of the present invention.

Exemplarily, using downlink data transmission as an example, as shown in FIG. 10, a Netfilter mechanism may be used to capture an air interface uplink ACK packet at a capturing point shown by any elliptical dashed box, and meanwhile, an interception module is embedded into a system by using the Netfilter mechanism.

Functions of five detection points of an IP layer shown in FIG. 10 are separately described herein. As shown in FIG. 10, detection point 1 (NF_IP_PRE_ROUTING): a data packet just entering a network layer passes through the point (detection such as version number check is performed), and destination address conversion is performed by means of the point; detection point 2 (NF_IP_LOCAL_IN): after routing searching, a data packet sent to a local device passes through the detection point, and filtering of an Input packet is performed by means of the detection point; detection point 3 (NF_IP_FORWARD): a to-be-forwarded packet passes through the point, and filtering of a FORWARD packet is performed by means of the detection point; detection point 4 (NF_IP_POST_ROUTING): all data packets to be sent by means of a network device pass through the detection point, and a built-in source address conversion function (including address masquerading) is performed by means of the detection point; and detection point 5 (NF_IP_LOCAL_OUT): a packet sent by a local process passes through the detection point and filtering of an Output packet is performed by means of the detection point.

In the data transmission method provided in this embodiment of the present invention, a first device obtains a TCP-layer ACK; and intercepts the TCP-layer ACK if a TCP-layer data packet corresponding to the TCP-layer ACK is a TCP-layer data packet that is obtained by the first device after the first device parses a link layer data packet received through a radio air interface link by the first device, and the TCP-layer ACK satisfies a preset condition.

Compared with the prior art that a large amount of TCP-layer ACK packet transmission occupies radio air interface link resources and increases consumption of radio air interface link resources, in this solution, the first device may perform interception decision on the TCP-layer ACK, and when the corresponding TCP-layer data packet is the TCP-layer data packet that is obtained by the first device after the first device parses the link layer data packet received through the radio air interface link by the first device, and the TCP-layer ACK satisfies the preset condition, intercept the TCP-layer ACK, that is, does not send the TCP-layer ACK to a second device. Therefore, a quantity of TCP-layer ACK packets transmitted on the radio air interface link between the first device and the second device can be reduced, thereby reducing consumption of radio air interface link resources, improving transmission efficiency of radio service data, and improving a capacity of a radio communications system.

Embodiment 2

Figure 3:
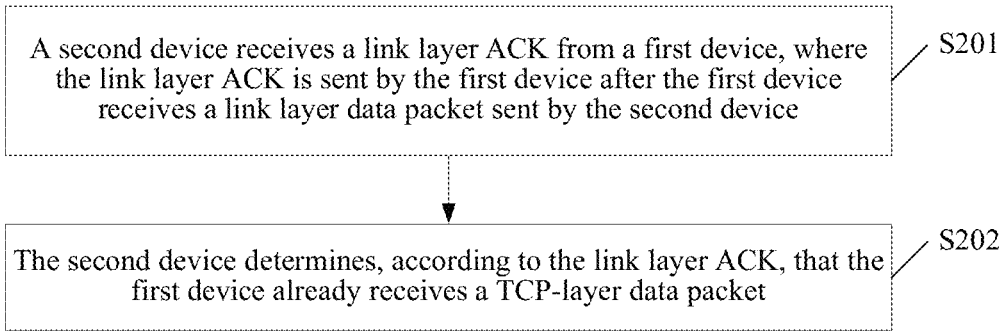
FIG. 3 is a flowchart of a data transmission method according to Embodiment 2 of the present invention.

This embodiment of the present invention provides a data transmission method, which may be applied to a second device. This embodiment may be applied to a process in which a first device and the second device perform uplink data transmission or downlink data transmission. As shown in FIG. 3, the data transmission method includes:

S201: The second device receives a link layer ACK from the first device, where the link layer ACK is sent by the first device after the first device receives a link layer data packet sent by the second device.

In one aspect, in a downlink data transmission scenario based on a TCP connection, the first device is user equipment and the second device is a RAN side device.

In the downlink data transmission process based on a TCP connection, the RAN side device (the second device) may receive a TCP-layer data packet from an application server, encapsulate the TCP-layer data packet to obtain a link layer data packet, and then, send the link layer data packet to the user equipment (the first device); after receiving the link layer data packet, the user equipment (the first device) may send a link layer ACK to the RAN side device (the second device), and meanwhile, after receiving the link layer data packet, the user equipment may parse the link layer data packet to obtain the corresponding TCP-layer data packet, and generate a TCP-layer ACK according to the TCP-layer data packet obtained through parsing.

In another aspect, in an uplink data transmission scenario based on a TCP connection, the first device is a RAN side device and the second device is user equipment.

In the uplink data transmission scenario, after obtaining a TCP-layer data packet, the user equipment (the second device) may encapsulate the TCP-layer data packet to obtain a link layer data packet, and then, send the link layer data packet to the RAN side device (the first device); after receiving the link layer data packet, the RAN side device (the first device) may send a link layer ACK to the user equipment (the second device), and meanwhile, after receiving the link layer data packet, the RAN side device (the first device) may parse the link layer data packet to obtain the corresponding TCP-layer data packet, send the TCP-layer data packet obtained through parsing to an application server, and then, receive a TCP-layer ACK from the application server, where the TCP-layer ACK is a TCP-layer ACK corresponding to the TCP-layer data packet that is obtained by the RAN side device (the first device) through parsing.

S202: The second device determines, according to the link layer ACK, that the first device already receives a TCP-layer data packet.

The second device may obtain a mapping relationship between the TCP-layer data packet and the link layer data packet (the mapping relationship between the TCP-layer data packet and the link layer data packet includes at least: a mapping relationship between a sequence number of the TCP-layer data packet and a sequence number of the link layer data packet); then, determine, according to a sequence number of the link layer data packet and the mapping relationship between the sequence number of the TCP-layer data packet and the sequence number of the link layer data packet, a sequence number of the TCP-layer data packet corresponding to the link layer data packet successfully received by the first device, where the sequence number of the TCP-layer data packet corresponding to the link layer data packet successfully received by the first device is a sequence number of the TCP-layer data packet successfully received by the first device.

In the data transmission method provided in this embodiment of the present invention, a second device receives a link layer acknowledgement ACK from a first device, where the link layer ACK is sent by the first device after the first device receives a link layer data packet sent by the second device; and determines, according to the link layer ACK, that the first device already receives a TCP-layer data packet.

Compared with the prior art that a large amount of TCP-layer ACK packet transmission occupies radio air interface link resources and increases consumption of radio air interface link resources, in this solution, after the first device intercepts a TCP-layer ACK, the second device may determine, according to the link layer ACK sent by the first device, whether the first device successfully receives the TCP-layer data packet. In this way, an acknowledgement mechanism between a data transmit end and a data receive end can still be ensured in a case in which a quantity of TCP-layer ACK packets transmitted on a radio air interface link between the first device and the second device is reduced.

Embodiment 3

This embodiment of the present invention provides a data transmission method, which may be applied to a downlink data transmission process based on a TCP connection, that is, a first device is specifically user equipment and a second device is specifically a RAN side device.

Figure 4A:
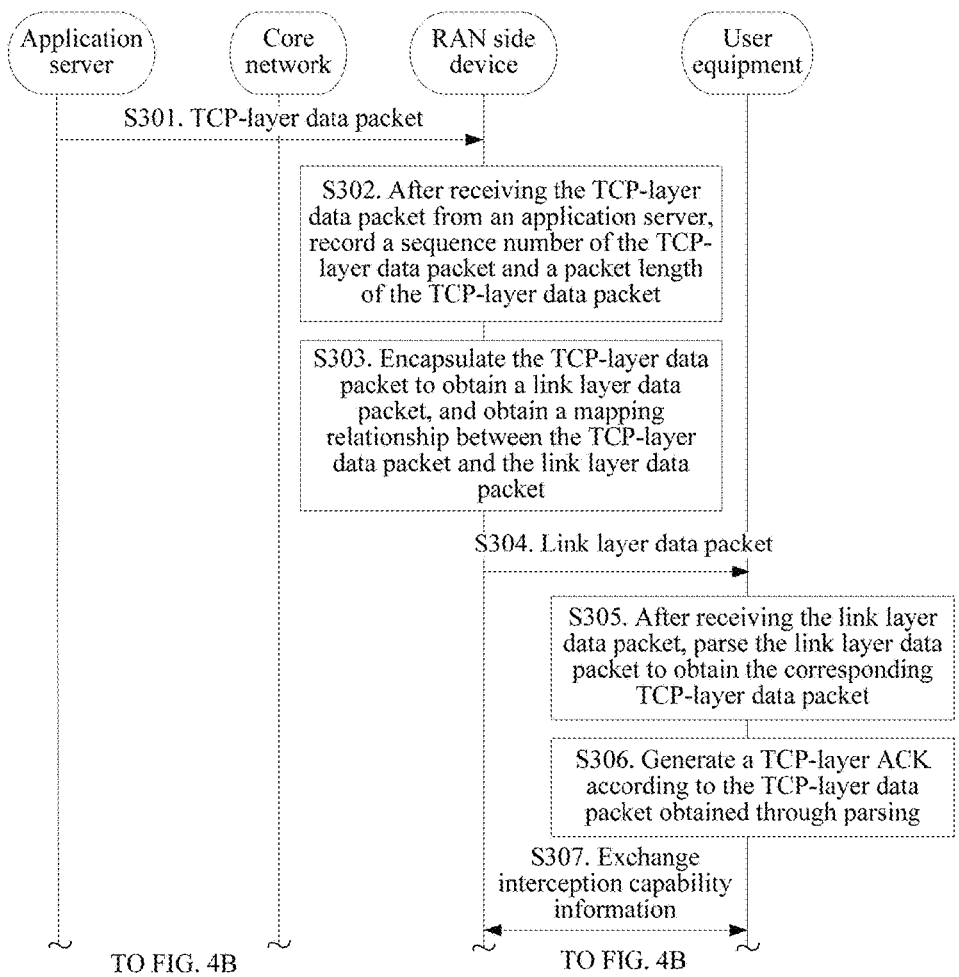
FIG. 4A and FIG. 4B are a flowchart of another data transmission method according to Embodiment 3 of the present invention.
Figure 4B:
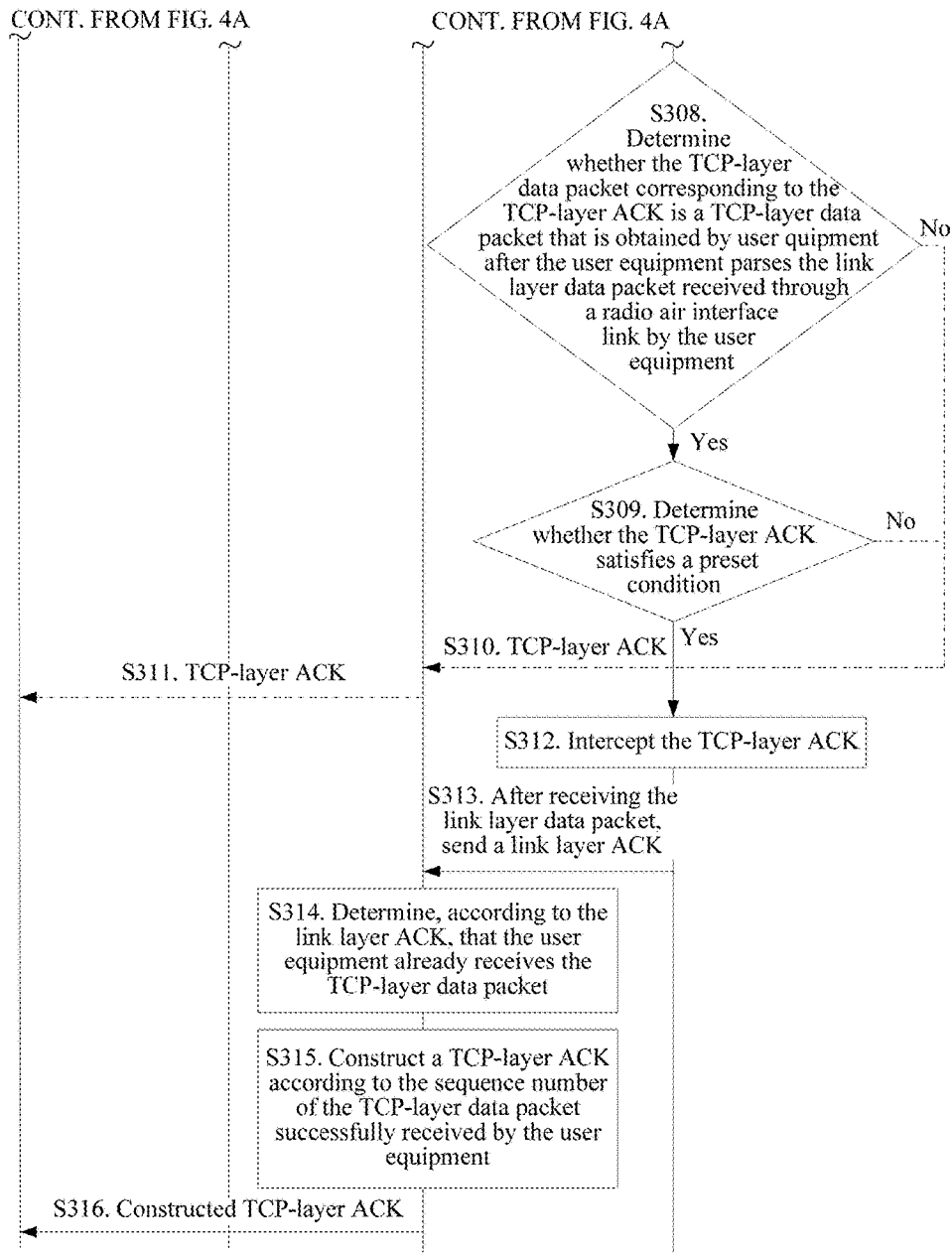

This embodiment further describes the method in the embodiments of the present invention by using an example in which when there is no TCP agent of any type in the RAN side device or there is a TCP agent of a Snoop TCP type in the RAN side device, the RAN side device transmits downlink data to the user equipment. Specifically, as shown in FIG. 4A and FIG. 4B, the data transmission method may include:

S301: The RAN side device receives a TCP-layer data packet from an application server.

S302: After receiving the TCP-layer data packet from the application server, the RAN side device records a sequence number of the TCP-layer data packet and a packet length of the TCP-layer data packet.

S303: The RAN side device encapsulates the TCP-layer data packet to obtain a link layer data packet, and obtains a mapping relationship between the TCP-layer data packet and the link layer data packet.

The mapping relationship between the TCP-layer data packet and the link layer data packet includes at least: a mapping relationship between the sequence number of the TCP-layer data packet and a sequence number of the link layer data packet.

It should be noted that, for a specific method for encapsulating, by the RAN side device, the TCP-layer data packet into the link layer data packet, refer to corresponding descriptions of data packet encapsulation in the prior art, and details are not described in this embodiment.

S304: The RAN side device sends the link layer data packet to the user equipment.

S305: After receiving the link layer data packet, the user equipment parses the link layer data packet to obtain the corresponding TCP-layer data packet.

S306: The user equipment generates a TCP-layer ACK according to the TCP-layer data packet obtained through parsing.

In a first application scenario of this embodiment, a radio air interface link between the user equipment and the RAN side device may be a 3GPP link, that is, data is transmitted between the user equipment and the RAN side device by means of a 3GPP air interface.

In the first application scenario, the user equipment may include a processing entity of a TCP IP protocol stack and a processing entity of a 3GPP air interface protocol stack. The user equipment may receive the link layer data packet from the RAN side device by using the processing entity of the 3GPP air interface protocol stack in the user equipment, parse the link layer data packet to obtain the corresponding TCP-layer data packet, and then, transmit the TCP-layer data packet obtained through parsing to the processing entity of the TCP IP protocol stack in the user equipment. The processing entity of the TCP IP protocol stack may generate the TCP-layer ACK according to the TCP-layer data packet received from the processing entity of the 3GPP air interface protocol stack, and then, the processing entity of the TCP IP protocol stack transmits the TCP-layer ACK to the processing entity of the 3GPP air interface protocol stack. The processing entity of the 3GPP air interface protocol stack encapsulates the TCP-layer ACK, and sends the encapsulated TCP-layer ACK to the RAN side device by means of a radio air interface link between the user equipment and the RAN side device.

It should be noted that, in a second application scenario of this embodiment, a radio air interface link between the user equipment and the RAN side device may be a WiFi link, that is, data is transmitted between the user equipment and the RAN side device by means of a WiFi air interface.

In the second application scenario, the user equipment may include a processing entity of a TCP IP protocol stack and a processing entity of a WiFi air interface protocol stack. The user equipment may receive the link layer data packet from the RAN side device by using the processing entity of the WiFi air interface protocol stack in the user equipment, parse the link layer data packet to obtain the corresponding TCP-layer data packet, and then, transmit the TCP-layer data packet obtained through parsing to the processing entity of the TCP IP protocol stack in the user equipment. The processing entity of the TCP IP protocol stack may generate the TCP-layer ACK according to the TCP-layer data packet received from the processing entity of the WiFi air interface protocol stack, and then, the processing entity of the TCP IP protocol stack transmits the TCP-layer ACK to the processing entity of the WiFi air interface protocol stack. The processing entity of the WiFi air interface protocol stack encapsulates the TCP-layer ACK, and sends the encapsulated TCP-layer ACK to the RAN side device by means of a radio air interface link between the user equipment and the RAN side device.

It should be noted that, the TCP-layer data packet corresponding to the TCP-layer ACK may be the TCP-layer data packet that is obtained by the user equipment after the user equipment parses the link layer data packet received through the radio air interface link by the user equipment; or the TCP-layer data packet corresponding to the TCP-layer ACK may be a TCP-layer data packet that is obtained by the user equipment after the user equipment parses a link layer data packet received through a wired link by the user equipment. Because in this embodiment of the present invention, interception decision is performed on only the TCP-layer data packet of the link layer data packet received through the radio air interface link by the user equipment, this embodiment describes only a specific process of generating the TCP-layer ACK according to the TCP-layer data packet of the link layer data packet received through the radio air interface link.

Further, optionally, in this embodiment of the present invention, after generating the TCP-layer ACK, the user equipment needs to determine whether the TCP-layer ACK satisfies a preset condition, and then, determine, according to a determining result, whether to intercept the TCP-layer ACK. The RAN needs to determine operation processing that the RAN side device needs to perform after the user equipment intercepts the TCP-layer ACK, that is, the RAN side device and the user equipment need to exchange statuses of supporting an interception capability. Therefore, the method in this embodiment of the present invention may further include:

S307: The user equipment and the RAN side device exchange interception capability information, where the interception capability information includes: a category of ACK interception of which is supported by both the user equipment and the RAN side device and an interception parameter that is supported by both the user equipment and the RAN side device.

Specifically, the user equipment and the RAN side device may exchange the interception capabilities by means of a capability negotiation process. S307 may include S307a to S307f.

S307a: The user equipment receives first capability negotiation signaling from the RAN side device, where the first capability negotiation signaling includes a first interception operation and a first interception parameter.

The first interception operation is operation processing corresponding to a first ACK category, the first ACK category is an ACK category to which a TCP-layer ACK that is intercepted when the RAN side device supports interception decision by the user equipment belongs, the first ACK category includes a first interception category and/or a second interception category, the first interception parameter is an interception parameter used when the RAN side device supports interception decision by the user equipment, and the first interception parameter includes at least a preset threshold of a receive window carried in the TCP-layer ACK.

S307b: The user equipment determines an ACK category intersection according to the first interception operation and a second ACK category, and determines an interception parameter intersection according to the first interception parameter and a second interception parameter.

The ACK category intersection is an intersection of the first ACK category and the second ACK category, and the interception parameter intersection is an intersection of the first interception parameter and the second interception parameter. The second ACK category is an ACK category to which a TCP-layer ACK that is intercepted by the user equipment when the user equipment makes interception decision belongs, and the second ACK category includes the first interception category and/or the second interception category. The second interception parameter is an interception parameter used when the user equipment makes interception decision, and the second interception parameter includes at least a preset threshold of the receive window carried in the TCP-layer ACK.

S307c: The user equipment determines, according to the ACK category intersection, the category of ACK interception of which is supported by both the user equipment and the RAN side device, and determines, according to the interception parameter intersection, the interception parameter that is supported by both the user equipment and the RAN side device.

S307d: The user equipment sends second capability negotiation signaling to the RAN side device, where the second capability negotiation signaling includes the second ACK category and the second interception parameter.

S307e: The RAN side device determines the ACK category intersection according to the second ACK category and the first interception operation, and determines the interception parameter intersection according to the second interception parameter and the first interception parameter.

Exemplarily, assuming that the first ACK category (that is, the ACK category to which an ACK that is intercepted when the RAN side device supports interception decision by the user equipment belongs) includes the first interception category and the second interception category, and the second ACK category (that is, the ACK category to which an ACK that is intercepted by the user equipment when the user equipment makes interception decision belongs) includes the first interception category, the RAN side device may determine that the ACK category intersection is the intersection of the first ACK category and the second ACK category, that is, the first interception category.

It is assumed that the preset threshold in the first interception parameter is 2 and the preset threshold in the second interception parameter is 3. Because when the user equipment determines that the TCP-layer ACK satisfies the preset condition, it is required that the receive window carried in the TCP-layer ACK is not less than the preset threshold, the RAN side device may use a larger threshold in the preset threshold in the first interception parameter and the preset threshold in the second interception parameter as an interception parameter intersection (the intersection of the first interception parameter and the second interception parameter), that is, the RAN side device may use the threshold 3 as the interception parameter intersection.

S307f: The RAN side device determines, according to the ACK category intersection, the category of ACK interception of which is supported by both the user equipment and the RAN side device, and determines, according to the interception parameter intersection, the interception parameter that is supported by both the user equipment and the RAN side device.

Further, optionally, in the second application scenario of this embodiment of the present invention, the RAN side device may specify to the user equipment a status of supporting, by the RAN side device, an interception capability, and the user equipment determines, according to the interception capability specified by the RAN side device, a status of supporting, by the user equipment, the interception capability. S307 may be replaced with S307'.

S307': The RAN side device specifies interception capability information to the user equipment, where the interception capability information includes an ACK category interception of which is supported by the RAN side device and an interception parameter that is supported by the RAN side device.

S307' may include S307a, S307g, and S307h.

S307a: The user equipment receives first capability negotiation signaling from the RAN side device, where the first capability negotiation signaling includes a first interception operation and a first interception parameter.

The first interception operation is operation processing corresponding to a first ACK category, the first ACK category is an ACK category to which a TCP-layer ACK that is intercepted when the RAN side device supports interception decision by the user equipment belongs, the first ACK category includes a first interception category and/or a second interception category, the first interception parameter is an interception parameter used when the RAN side device supports interception decision by the user equipment, and the first interception parameter includes at least a preset threshold of the receive window carried in the TCP-layer ACK.

Exemplarily, the first ACK category is an ACK category to which a TCP-layer ACK that is intercepted when the RAN side device supports interception decision by the user equipment belongs. For example, when the RAN side device supports interception decision by the user equipment, the user equipment intercepts a TCP-layer ACK belonging to the first interception category. In this case, if the user equipment intercepts the TCP-layer ACK belonging to the first interception category, the RAN side device may perform the first interception operation without receiving the TCP-layer ACK, to ensure an acknowledgment mechanism of TCP data transmission between the RAN side device and the user equipment. The first interception operation may be an operation that is performed by the RAN side device when the TCP-layer ACK belongs to the first interception category or the second interception category in the first ACK category, to ensure the acknowledgement mechanism of the TCP data transmission between the RAN side device and the user equipment.

S307g. The user equipment determines, according to the first interception operation, a category of ACK interception of which is supported by the user equipment, and determines, according to the first interception parameter, an interception parameter that is supported by the user equipment.

Specifically, the user equipment may determine that the first ACK category is the category of ACK interception of which is supported by both the user equipment and the RAN side device, and determine that the first interception parameter is the interception parameter that is supported by both the user equipment and the RAN side device.

S307h. The RAN side device determines, according to the first interception operation, a category of ACK interception of which is supported by the RAN side device, and determines, according to the first interception parameter, an interception parameter that is supported by the RAN side device.

Specifically, the RAN side device may determine that the first ACK category is the category of ACK interception of which is supported by both the user equipment and the RAN side device, and determine that the first interception parameter is the interception parameter that is supported by both the user equipment and the RAN side device.

It should be noted that, in this embodiment of the present invention, S301 to S306 may be performed first and S307 is performed then; or S307 may be performed first and S301 to S306 are performed then; or S301 to S306 and S307 may be performed at the same time. This embodiment of the present invention does not limit a sequence between S301 to S306 and S307.

S308: The user equipment determines whether the TCP-layer data packet corresponding to the TCP-layer ACK is a TCP-layer data packet that is obtained by the user equipment after the user equipment parses the link layer data packet received through a radio air interface link by the user equipment.

Specifically, if the TCP-layer data packet corresponding to the TCP-layer ACK is the TCP-layer data packet that is obtained by the user equipment after the user equipment parses the link layer data packet received through the radio air interface link by the user equipment, S309 is performed; or if the TCP-layer data packet corresponding to the TCP-layer ACK is not the TCP-layer data packet that is obtained by the user equipment after the user equipment parses the link layer data packet received through the radio air interface link by the user equipment, S310 and S311 are performed.

S309: The user equipment determines whether the TCP-layer ACK satisfies a preset condition.

Exemplarily, in an application scenario of this embodiment of the present invention, that the TCP-layer ACK satisfies the preset condition may include: the TCP-layer ACK does not satisfy at least one filter condition in a first filter criterion, and the TCP-layer ACK belongs to at least one of the first interception category or the second interception category.

The first filter criterion includes at least: one of the following filter conditions or a combination of multiple filter conditions of the following filter conditions: 1) the TCP-layer ACK is an ACK that is carried, after the user equipment receives a link layer data packet, another data packet sent to the RAN side device and that is sent to the RAN side device in a delaying manner; 2) the TCP-layer ACK is an ACK in which a SYN bit is not set to 1; 3) the TCP-layer ACK carries a TCP maximum segment size option, a TCP window scale option, and a TCP Sack-permitted option; 4) the TCP-layer ACK carries a TCP option related to the MPTCP protocol; and 5) a receive window carried in the TCP-layer ACK is not less than a preset threshold.

In the first interception category, a TCP-layer data packet corresponding to a sequence number of the TCP-layer ACK is not recorded in a buffer of TCP-layer data packets, and TCP-layer data packets corresponding to ACK sequence numbers before the sequence number of the TCP-layer ACK are all recorded in the buffer of the TCP-layer data packets.

In the second interception category, the sequence number of the TCP-layer ACK is equal to a first sequence number, and the first sequence number is updated once each time after a TCP-layer ACK is obtained but before the obtained TCP-layer ACK is intercepted.

Further, optionally, that the TCP-layer ACK satisfies the preset condition may further include: the TCP-layer ACK does not satisfy at least one filter condition in a second filter criterion.

The filter conditions in the second filter criterion include at least: 1) the TCP-layer ACK carries a TCP timestamps option; and 2) the TCP-layer ACK carries a TCP Sack option.

Specifically, if the TCP-layer ACK satisfies the preset condition, S312 is directly performed (that is, the TCP-layer ACK is intercepted); or if the TCP-layer ACK does not satisfy the preset condition, S310 and S311 are performed.

S310: The user equipment sends the TCP-layer ACK to the RAN side device.

S311: The RAN side device sends the TCP-layer ACK to the application server.

S312: The user equipment intercepts the TCP-layer ACK.

Specifically, the user equipment may implement interception decision on the TCP-layer ACK by using an interception module configured in the user equipment.

In the first application scenario of this embodiment, the radio air interface link between the user equipment and the RAN side device may be the 3GPP link, and data is transmitted between the user equipment and the RAN side device by means of the 3GPP air interface, that is, the user equipment is a terminal supporting a 3GPP link. The user equipment includes the processing entity of the TCP IP protocol stack and the processing entity of the 3GPP air interface protocol stack.

Preferably, in one case of the first application scenario, the interception module may be deployed on a TCP layer or an IP layer of the processing entity of the TCP IP protocol stack.

In this case, the processing entity of the TCP IP protocol stack implements interception decision on the TCP-layer ACK; and when the TCP-layer ACK satisfies the preset condition, the processing entity of the TCP IP protocol stack intercepts the TCP-layer ACK and does not transmit the TCP-layer ACK to the processing entity of the 3GPP air interface protocol stack; or when the TCP-layer ACK does not satisfy the preset condition, the processing entity of the TCP IP protocol stack transmits the TCP-layer ACK to the processing entity of the 3GPP air interface protocol stack.

Optionally, in another case of the first application scenario, the interception module may be deployed on a protocol layer, which is the first to process air interface uplink data, of the processing entity of the 3GPP air interface protocol stack. For example, on an LTE network and a UMTS network, the interception module may be deployed on a PDCP layer of the processing entity of the 3GPP air interface protocol stack.

In this case, the processing entity of the 3GPP air interface protocol stack implements interception decision on the TCP-layer ACK. Specifically, after receiving the TCP-layer ACK from the processing entity of the TCP IP protocol stack, the processing entity of the 3GPP air interface protocol stack may perform interception decision on the TCP-layer ACK, and when the TCP-layer ACK satisfies the preset condition, intercept the TCP-layer ACK.

It should be noted that, when the user equipment is a 3GPP link-enabled terminal, the TCP-layer ACK received by the interception module of the user equipment may include ACKs corresponding to TCP-layer data packets from two links: 1) a TCP-layer ACK corresponding to a TCP-layer data packet from a wired link (when a wired TCP connection exists between the user equipment and the RAN side device); and 2) a TCP-layer ACK corresponding to an air interface downlink TCP-layer data packet from a 3GPP link. Therefore, the user equipment needs to determine whether the TCP-layer data packet corresponding to the TCP-layer ACK is a TCP-layer data packet received through the radio air interface link; when the TCP-layer data packet corresponding to the TCP-layer ACK is a TCP-layer data packet received through the radio air interface link (the 3GPP radio air interface link), the user equipment further determines whether the TCP-layer ACK satisfies a filter criterion (the first filter criterion, or the first filter criterion and the second filter criterion); and when the TCP-layer data packet corresponding to the TCP-layer ACK is a TCP-layer data packet received through the wired link, the user equipment does not intercept the TCP-layer ACK.

In the second application scenario of this embodiment, the user equipment includes the processing entity of the TCP IP protocol stack and the processing entity of the WiFi air interface protocol stack.

Preferably, in one case of the second application scenario, the interception module may be deployed on a TCP layer or an IP layer of the processing entity of the TCP IP protocol stack.

In this case, the processing entity of the TCP IP protocol stack implements interception decision on the TCP-layer ACK; and when the TCP-layer ACK satisfies the preset condition, the processing entity of the TCP IP protocol stack intercepts the TCP-layer ACK and does not transmit the TCP-layer ACK to the processing entity of the WiFi air interface protocol stack; or when the TCP-layer ACK does not satisfy the preset condition, the processing entity of the TCP IP protocol stack transmits the TCP-layer ACK to the processing entity of the WiFi air interface protocol stack.

Optionally, in another case of the second application scenario, the radio air interface link between the user equipment and the RAN side device may be a WiFi link, and data is transmitted between the user equipment and the RAN side device by means of a WiFi air interface, that is, the user equipment is a WiFi link-enabled terminal. The interception module may be deployed on a protocol layer, which is the first to process air interface uplink data, of the processing entity of the WiFi air interface protocol stack. For example, the interception module may be deployed on a MAC layer of the processing entity of the WiFi air interface protocol stack.

In this case, the processing entity of the WiFi air interface protocol stack implements interception decision on the TCP-layer ACK. Specifically, after receiving the TCP-layer ACK from the processing entity of the TCP IP protocol stack, the processing entity of the WiFi air interface protocol stack may perform interception decision on the TCP-layer ACK, and when the TCP-layer ACK satisfies the preset condition, intercept the TCP-layer ACK and does not encapsulate or send the TCP-layer ACK.

It should be noted that, when the user equipment is a WiFi link-enabled terminal, the TCP-layer ACK (the TCP-layer ACK) received by the interception module of the user equipment may include ACKs corresponding to TCP-layer data packets from two links: 1) a TCP-layer ACK corresponding to a TCP-layer data packet from a wired link (when a wired TCP connection exists between the user equipment and the RAN side device); and 2) a TCP-layer ACK corresponding to an air interface downlink TCP-layer data packet from a WiFi link. Therefore, the user equipment needs to determine whether the TCP-layer data packet corresponding to the TCP-layer ACK is a TCP-layer data packet received through the radio air interface link; when the TCP-layer data packet corresponding to the TCP-layer ACK is a TCP-layer data packet received through the radio air interface link (the WiFi radio air interface link), the user equipment further determines whether the TCP-layer ACK satisfies a filter criterion (the first filter criterion, or the first filter criterion and the second filter criterion); and when the TCP-layer data packet corresponding to the TCP-layer ACK is a TCP-layer data packet received through the wired link, the user equipment does not intercept the TCP-layer ACK.

Further, when the user equipment is a terminal supporting multiple concurrent wireless links (that is, not only the WiFi radio air interface link but also the 3GPP radio air interface link is established between the user equipment and the RAN side device), the TCP-layer ACK received by the interception module of the user equipment may include ACKs corresponding to TCP-layer data packets from three links: 1) a TCP-layer ACK corresponding to a TCP-layer data packet from a wired link (when there is a wired TCP connection between the user equipment and the RAN side device); 2) a TCP-layer ACK corresponding to an air interface downlink TCP-layer data packet from a WiFi link; and 3) a TCP-layer ACK corresponding to an air interface downlink TCP-layer data packet from a 3GPP link. Therefore, the user equipment needs to determine whether the TCP-layer data packet corresponding to the TCP-layer ACK is a TCP-layer data packet received through the radio air interface link (the WiFi radio air interface link or the 3GPP radio air interface link); when the TCP-layer data packet corresponding to the TCP-layer ACK is a TCP-layer data packet received through the radio air interface link, the user equipment further determines whether the TCP-layer ACK satisfies a filter criterion (the first filter criterion, or the first filter criterion and the second filter criterion); and when the TCP-layer data packet corresponding to the TCP-layer ACK is a TCP-layer data packet received through the wired link, the user equipment does not intercept the TCP-layer ACK.

It should be noted that when the user equipment is a wireless concurrency-enabled terminal, the interception module is generally deployed on the processing entity of the TCP IP protocol stack. Specifically, when the interception module is generally deployed on the processing entity of the 3GPP air interface protocol stack or the processing entity of the WiFi air interface protocol stack in the user equipment, the processing entity of the 3GPP air interface protocol stack and the processing entity of the WiFi air interface protocol stack cannot obtain packet data information of a downlink TCP-layer data packet in a concurrent scenario. Therefore, information needs to be exchanged by means of an effective and high-speed data transmission channel, which has complex implementation. The processing entity of the TCP IP protocol stack is an aggregation point of multiple links (a transmission link of a downlink TCP-layer data packet and an uplink TCP-layer ACK), and when the interception module is deployed on the processing entity of the TCP IP protocol stack, processing entities do not need to exchange information, which can simplify a processing process.

Based on a link layer acknowledgement mechanism, after receiving the link layer data packet, the user equipment may reply to the RAN side device with a link layer ACK.

S313: After receiving the link layer data packet, the user equipment sends a link layer ACK to the RAN side device.

It should be noted that, in this embodiment of the present invention, S305 may be performed first and S313 is performed then; or S313 may be performed first and S305 is performed then; or S305 and S313 may be performed at the same time. This embodiment of the present invention does not limit a sequence between S305 and S313.

S314: The RAN side device determines, according to the link layer ACK, that the user equipment already receives the TCP-layer data packet.

Specifically, the RAN side device may determine, according to the sequence number of the link layer data packet and the mapping relationship between the sequence number of the TCP-layer data packet and the sequence number of the link layer data packet, a sequence number of the TCP-layer data packet corresponding to the link layer data packet successfully received by the user equipment, where the sequence number of the TCP-layer data packet corresponding to the link layer data packet successfully received by the user equipment is a sequence number of the TCP-layer data packet successfully received by the user equipment.

It should be noted that, in this embodiment, there is no TCP agent of any type in the RAN side device, or there is a TCP agent of a Snoop TCP type in the RAN side device. When there is no TCP agent of any type in the RAN side device or there is the TCP agent of the Snoop TCP type in the RAN side device, after receiving the TCP-layer data packet from the application server, the RAN side device cannot directly reply to the application server with a corresponding TCP-layer ACK, and the RAN side device can reply to the application server with the corresponding TCP-layer ACK only after determining that the user equipment already successfully receives the TCP-layer data packet. In the prior art, because a TCP-layer ACK is intercepted, the RAN side device can directly send the TCP-layer ACK to the application server after receiving the TCP-layer ACK from the user equipment, to indicate to the application server that the corresponding TCP-layer data packet is already successfully sent to the user equipment. However, in this embodiment of the present invention, if the user equipment intercepts the TCP-layer ACK, the RAN side device needs to determine, according to the link layer ACK, that the user equipment already receives the TCP-layer data packet. In this case, the RAN side device needs to generate a TCP-layer ACK that can be used to indicate to the application server that the TCP-layer data packet is already successfully sent to the user equipment. Therefore, the method in this embodiment of the present invention may further include S315.

S315: The RAN side device constructs a TCP-layer ACK according to the sequence number of the TCP-layer data packet successfully received by the user equipment.

A sequence number of the TCP-layer ACK is a sum of a sequence number of a continuity-acknowledged data packet and a packet length of the continuity-acknowledged data packet, the TCP-layer ACK is used to indicate to the application server that the user equipment already receives the TCP-layer data packet, and the link layer data packet is obtained by the RAN side device after the RAN side device encapsulates a TCP layer data packet received from the application server. The continuity-acknowledged data packet is a TCP-layer data packet having a largest sequence number in consecutive TCP-layer data packets arranged in ascending order of sequence numbers in all TCP-layer data packets that are already determined by the RAN side device and that are successfully received by the user equipment.

Specifically, a method for constructing, by the RAN side device, the TCP-layer ACK according to the link layer ACK received from the user equipment through a link layer may be: searching for, by the RAN side device, the corresponding TCP-layer data packet according to the sequence number of the link layer data packet corresponding to the link layer ACK and the mapping relationship between the sequence number of the TCP-layer data packet and the sequence number of the link layer data packet, where the found TCP-layer data packet is the TCP-layer data packet corresponding to the link layer data packet successfully received by the user equipment and a TCP-layer data packet corresponding to a link layer data packet that the user equipment does not successfully receive. S315 may specifically include S315a to S315c.

S315a: The RAN side device determines, according to the sequence number of the link layer data packet and the mapping relationship between the sequence number of the TCP-layer data packet and the sequence number of the link layer data packet, a sequence number of the TCP-layer data packet corresponding to the link layer data packet successfully received by the user equipment and a sequence number of a TCP-layer data packet corresponding to a link layer data packet that the user equipment does not successfully receive.

S315b: The RAN side device constructs a TCP-layer ACK according to the sequence number of the TCP-layer data packet successfully received by the user equipment.

Specifically, the method for constructing, by the RAN side device, the TCP-layer ACK may include: constructing, by the RAN side device, the TCP-layer ACK according to the sequence number of the TCP-layer data packet corresponding to the link layer data packet successfully received by the user equipment and with reference to the category of ACK interception of which is supported by both the user equipment and the RAN side device, where a sequence number of the to-be-constructed TCP-layer ACK is the sum of the sequence number of the continuity-acknowledged data packet and the packet length of the continuity-acknowledged data packet. For detailed descriptions of the continuity-acknowledged data packet, refer to related descriptions in the embodiments of the present invention, and details are not described in this embodiment of the present invention again.

Exemplarily, in an application scenario of this embodiment of the present invention, the category of ACK interception of which is supported by both the user equipment and the RAN side device is the first interception category (in the first interception category, a link layer data packet corresponding to a current ACK sequence number is not recorded in a buffer of downlink link layer data packets, and link layer data packets corresponding to ACK sequence numbers before the current ACK sequence number are all recorded in the buffer of the downlink link layer data packets).

In this application scenario, S315b may specifically include the following step A.

Step A: The first time when the RAN side device receives the link layer ACK from the user equipment, the RAN side device uses a first data packet as a continuity-acknowledged data packet, and then, uses a sum of a sequence number of the continuity-acknowledged data packet and a packet length of the continuity-acknowledged data packet as a sequence number of a to-be-constructed TCP-layer ACK, to construct the TCP-layer ACK.

The first data packet is a data packet having a largest sequence number in consecutive TCP-layer data packets arranged in ascending order of sequence numbers from a TCP-layer data packet having a smallest sequence number in the TCP-layer data packets that are determined by the RAN side device the first time after the RAN side device receives the link layer ACK and that correspond to the link layer data packets successfully received by the user equipment.

Figure 6:
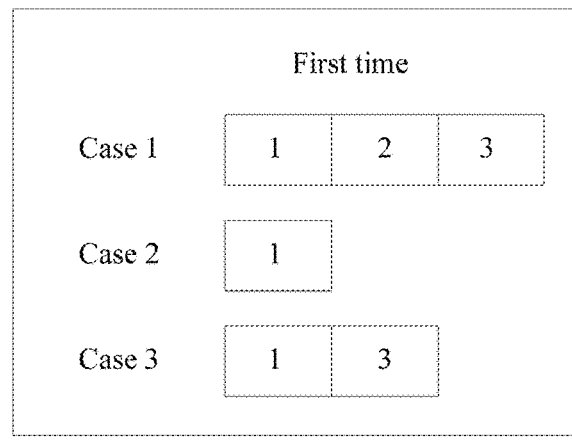
FIG. 6 is a schematic diagram of a data packet transmission process according to an embodiment of the present invention.

For example, as shown in case 1 in FIG. 6, when the TCP-layer data packet that is determined by the RAN side device the first time after the RAN side device receives the link layer ACK and that corresponds to the link layer data packet successfully received by the user equipment includes: a TCP-layer data packet whose sequence number is 1 (that is, a TCP-layer data packet 1), a TCP-layer data packet whose sequence number is 2 (that is, a TCP-layer data packet 2), and a TCP-layer data packet whose sequence number is 3 (that is, a TCP-layer data packet 3), the first data packet is the TCP-layer data packet 3 in the TCP-layer data packet 1, the TCP-layer data packet 2, and the TCP-layer data packet 3, that is, the TCP-layer data packet whose sequence number is 3, and the RAN side device may use a sum of the sequence number 3 of the TCP-layer data packet 3 and a packet length of the TCP-layer data packet 3 as the sequence number of the to-be-constructed TCP-layer ACK, to construct the TCP-layer ACK, that is, the TCP-layer data packet 3 is the continuity-acknowledged data packet.

As shown in case 2 in FIG. 6, when the TCP-layer data packet that is determined by the RAN side device the first time after the RAN side device receives the link layer ACK and that corresponds to the link layer data packet successfully received by the user equipment includes only the TCP-layer data packet whose sequence number is 1 (that is, the TCP-layer data packet 1), the first data packet is the TCP-layer data packet 1, that is, the TCP-layer data packet whose sequence number is 1, and the RAN side device may use a sum of the sequence number 1 of the TCP-layer data packet 1 and a packet length of the TCP-layer data packet 1 as the sequence number of the to-be-constructed TCP-layer ACK, to construct the TCP-layer ACK, that is, the TCP-layer data packet 1 is the continuity-acknowledged data packet.

As shown in case 3 in FIG. 6, when the TCP-layer data packet that is determined by the RAN side device the first time after the RAN side device receives the link layer ACK and that corresponds to the link layer data packet successfully received by the user equipment includes: the TCP-layer data packet whose sequence number is 1 (that is, the TCP-layer data packet 1) and the TCP-layer data packet whose sequence number is 3 (that is, the TCP-layer data packet 3), the first data packet is the TCP-layer data packet 1 in the TCP-layer data packet 1 and the TCP-layer data packet 3, that is, the TCP-layer data packet whose sequence number is 1, and the RAN side device may use the sum of the sequence number 1 of the TCP-layer data packet 1 and the packet length of the TCP-layer data packet 1 as the sequence number of the to-be-constructed TCP-layer ACK, to construct the TCP-layer ACK, that is, the TCP-layer data packet 1 is the continuity-acknowledged data packet.

Further, optionally, as shown in case 3 in FIG. 6, the TCP-layer data packet that is determined by the RAN side device the first time after the RAN side device receives the link layer ACK and that corresponds to the link layer data packet successfully received by the user equipment may further include the TCP-layer data packet 3 whose sequence number and the sequence number of the TCP-layer data packet 1 are discontinuous. Therefore, S315*b* may further include:

Step A': The first time after the RAN side device receives the link layer ACK from the user equipment, the RAN side device adds information about a second data packet to a discontinuity-acknowledged data packet set.

The second data packet is a TCP-layer data packet whose sequence number and the sequence number of the first data packet are discontinuous, whose sequence number is greater than the sequence number of the first data packet, and that is in the TCP-layer data packet that is determined by the RAN side device the first time after the RAN side device receives the link layer ACK and that corresponds to the link layer data packet successfully received by the user equipment.

For example, the TCP-layer data packet 3 in case 3 shown in FIG. 6 is the second data packet.

Further, it is assumed that sequence numbers of TCP-layer data packets that are determined by the RAN side device the $(N-1)^{th}$ time after the RAN side device receives the link layer ACK and that correspond to link layer data packets successfully received by the user equipment are consecutive sequence numbers. In any case shown in FIG. 7, the TCP-layer data packets that are determined by the RAN side device the $(N-1)^{th}$ time after the RAN side device receives the link layer ACK and that correspond to link layer data packets successfully received by the user equipment include: the TCP-layer data packet whose sequence number is 1 (that is, the TCP-layer data packet 1), the TCP-layer data packet whose sequence number is 2 (that is, the TCP-layer data packet 2), and the TCP-layer data packet whose sequence number is 3 (that is, the TCP-layer data packet 3). A continuity-acknowledged data packet determined by the RAN side device the $(N-1)^{th}$ time after the RAN side device receives the link layer ACK is the TCP-layer data packet whose sequence number is 3 (that is, the TCP-layer data packet 3), and S315*b* may further include step B and step C.

Step B: If TCP-layer data packets that are determined by the RAN side device the $N^{th}$ time after the RAN side device receives the link layer ACK and that correspond to link layer data packets successfully received by the user equipment include a third data packet, the RAN side device uses a fourth data packet as the continuity-acknowledged data packet, and then, uses a sum of a sequence number of the continuity-acknowledged data packet and a packet length of the continuity-acknowledged data packet as a sequence number of a to-be-constructed TCP-layer ACK.

The third data packet is a TCP-layer data packet whose sequence number and the sequence number of the continuity-acknowledged data packet determined by the RAN side device the $(N-1)^{th}$ time after the RAN side device receives the link layer ACK are continuous.

The fourth data packet is a data packet having a largest sequence number in consecutive TCP-layer data packets arranged in ascending order of sequence numbers from the third data packet in the TCP-layer data packets that are determined by the RAN side device the $N^{th}$ time after the RAN side device receives the link layer ACK and that correspond to the link layer data packets successfully received by the user equipment.

Figure 7:
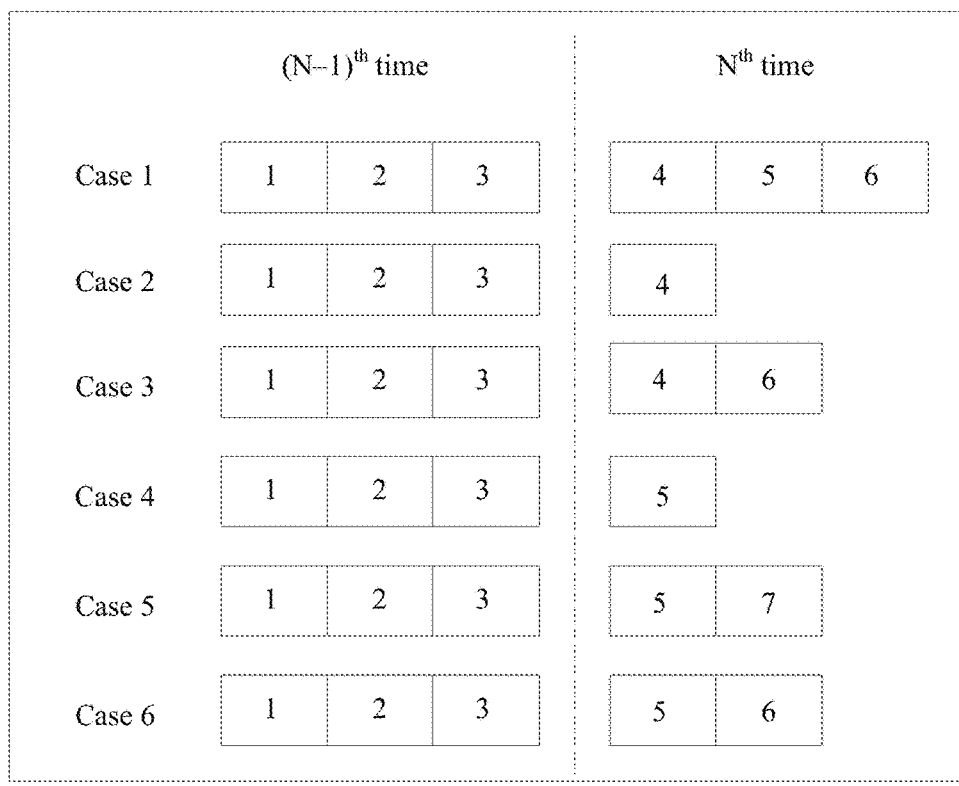
FIG. 7 is a schematic diagram of another data packet transmission process according to an embodiment of the present invention.

For example, as shown in case 1, case 2, and case 3 in FIG. 7, the TCP-layer data packets that are determined by the RAN side device the $N^{th}$ time after the RAN side device receives the link layer ACK and that correspond to the link layer data packets successfully received by the user equipment include a TCP-layer data packet 4, that is, a TCP-layer data packet whose sequence number is 4, whose sequence number and the sequence number 3 of the continuity-acknowledged data packet determined by the RAN side device the $(N-1)^{th}$ time after the RAN side device receives the link layer ACK are continuous. Therefore, the RAN side device may use the fourth data packet as the continuity-acknowledged data packet, and then, use the sum of the sequence number of the continuity-acknowledged data packet and the packet length of the continuity-acknowledged data packet as the sequence number of the to-be-constructed TCP-layer ACK.

Specifically, in case 1 in FIG. 7, in addition to the TCP-layer data packet whose sequence number is 4 (that is, the TCP-layer data packet 4), if the TCP-layer data packets that are determined by the RAN side device the $N^{th}$ time after the RAN side device receives the link layer ACK and that correspond to the link layer data packets successfully received by the user equipment further include a TCP-layer data packet whose sequence number is 5 (that is, a TCP-layer data packet 5) and a TCP-layer data packet whose sequence number is 6 (that is, a TCP-layer data packet 6), the fourth data packet is a data packet, that is, the TCP-layer data packet 6, having a largest sequence number in consecutive TCP-layer data packets arranged in ascending order of sequence numbers from the third data packet (the TCP-layer data packet 4) in the TCP-layer data packets that are determined by the RAN side device the $N^{th}$ time after the RAN side device receives the link layer ACK and that correspond to the link layer data packets successfully received by the user equipment.

In case 1 shown in FIG. 7, the RAN side device may use the TCP-layer data packet 6 as the continuity-acknowledged data packet, and then, use a sum of the sequence number of the TCP-layer data packet 6 and a packet length of the TCP-layer data packet 6 as the sequence number of the to-be-constructed TCP-layer ACK, to construct the TCP-layer ACK.

Optionally, in case 2 in FIG. 7, in addition to the TCP-layer data packet whose sequence number is 4 (that is, the TCP-layer data packet 4), the TCP-layer data packets that are determined by the RAN side device the $N^{th}$ time after the RAN side device receives the link layer ACK and that correspond to the link layer data packets successfully received by the user equipment do not include any other TCP-layer data packet, and the fourth data packet is the TCP-layer data packet 4.

In case 2 shown in FIG. 7, the RAN side device may use the TCP-layer data packet 4 as the continuity-acknowledged data packet, and then, use a sum of the sequence number of the TCP-layer data packet 4 and a packet length of the TCP-layer data packet 4 as the sequence number of the to-be-constructed TCP-layer ACK, to construct the TCP-layer ACK.

Optionally, in case 3 in FIG. 7, in addition to the TCP-layer data packet whose sequence number is 4 (that is, the TCP-layer data packet 4), the TCP-layer data packets that are determined by the RAN side device the $N^{th}$ time after the RAN side device receives the link layer ACK and that correspond to the link layer data packets successfully received by the user equipment further include the TCP-layer data packet whose sequence number is 6 (that is, the TCP-layer data packet 6). Because the sequence number of the TCP-layer data packet 6 and the sequence number of the TCP-layer data packet 4 are discontinuous, the fourth data packet is the TCP-layer data packet 4.

In case 3 shown in FIG. 7, the RAN side device may use the TCP-layer data packet 4 as the continuity-acknowledged data packet, and then, use the sum of the sequence number of the TCP-layer data packet 4 and the packet length of the TCP-layer data packet 4 as the sequence number of the to-be-constructed TCP-layer ACK, to construct the TCP-layer ACK.

Further, optionally, in case 3 in FIG. 7, in addition to the third data packet (a TCP-layer data packet whose sequence number and the sequence number of the continuity-acknowledged data packet determined by the RAN side device the $(N-1)^{th}$ time after the RAN side device receives the link layer ACK are continuous), the TCP-layer data packets that are determined by the RAN side device the $N^{th}$ time after the RAN side device receives the link layer ACK and that correspond to the link layer data packets successfully received by the user equipment may further include the TCP-layer data packet 6 whose sequence number and the sequence number of the third data packet (the TCP-layer data packet 4) are discontinuous. Therefore, S315b may further include:

Step B': If the TCP-layer data packets that are determined by the RAN side device the $N^{th}$ time after the RAN side device receives the link layer ACK and that correspond to the link layer data packets successfully received by the user equipment include the third data packet, the RAN side device adds information about a fifth data packet to the discontinuity-acknowledged data packet set.

The fifth data packet is a TCP-layer data packet whose sequence number and the sequence number of the third data packet are discontinuous, whose sequence number is greater than the sequence number of the third data packet, and that is in the TCP-layer data packets that are determined by the RAN side device the $N^{th}$ time after the RAN side device receives the link layer ACK and that correspond to the link layer data packets successfully received by the user equipment.

For example, the TCP-layer data packet 6 in case 3 in FIG. 7 is the fifth data packet.

Step C: If the TCP-layer data packets that are determined by the RAN side device the $N^{th}$ time after the RAN side device receives the link layer ACK and that correspond to the link layer data packets successfully received by the user equipment do not include the third data packet, the RAN side device adds information about a sixth data packet to the discontinuity-acknowledged data packet set.

The third data packet is the TCP-layer data packet whose sequence number and the sequence number of the continuity-acknowledged data packet determined by the RAN side device the $(N-1)^{th}$ time after the RAN side device receives the link layer ACK are continuous.

The sixth data packet may include the TCP-layer data packets that are determined by the RAN side device the $N^{th}$ time after the RAN side device receives the link layer ACK and that correspond to the link layer data packets successfully received by the user equipment.

For example, as shown in case 4, case 5, and case 6 in FIG. 7, the TCP-layer data packets that are determined by the RAN side device the $N^{th}$ time after the RAN side device receives the link layer ACK and that correspond to the link layer data packets successfully received by the user equipment do not include the TCP-layer data packet 4, that is, the TCP-layer data packet whose sequence number is 4, whose sequence number and the sequence number 3 of the continuity-acknowledged data packet determined by the RAN side device the $(N-1)^{th}$ time after the RAN side device receives the link layer ACK are continuous. Therefore, the RAN side device does not need to update the continuity-acknowledged data packet, and only needs to add the information about the sixth data packet to the discontinuity-acknowledged data packet set.

Specifically, in case 4 in FIG. 7, the TCP-layer data packets that are determined by the RAN side device the $N^{th}$ time after the RAN side device receives the link layer ACK and that correspond to the link layer data packets successfully received by the user equipment include the TCP-layer data packet whose sequence number is 5 (that is, the TCP-layer data packet 5), and the sixth data packet is the TCP-layer data packet 5.

In case 4 in FIG. 7, the RAN side device may add information about the TCP-layer data packet 5 to the discontinuity-acknowledged data packet set.

Optionally, in case 5 in FIG. 7, the TCP-layer data packets that are determined by the RAN side device the $N^{th}$ time after the RAN side device receives the link layer ACK and that correspond to the link layer data packets successfully received by the user equipment include the TCP-layer data packet whose sequence number is 5 (that is, the TCP-layer data packet 5) and a TCP-layer data packet whose sequence number is 7 (that is, a TCP-layer data packet 7), and the sixth data packet is the TCP-layer data packet 5 and the TCP-layer data packet 7.

In case 5 in FIG. 7, the RAN side device may add the information about the TCP-layer data packet 5 and information about the TCP-layer data packet 7 to the discontinuity-acknowledged data packet set.

Optionally, in case 6 in FIG. 7, the TCP-layer data packets that are determined by the RAN side device the $N^{th}$ time after the RAN side device receives the link layer ACK and that correspond to the link layer data packets successfully received by the user equipment include the TCP-layer data packet whose sequence number is 5 (that is, the TCP-layer data packet 5) and the TCP-layer data packet whose sequence number is 6 (that is, the TCP-layer data packet 6), and the sixth data packet is the TCP-layer data packet 5 and the TCP-layer data packet 6.

In case 6 in FIG. 7, the RAN side device may add the information about the TCP-layer data packet 5 and information about the TCP-layer data packet 6 to the discontinuity-acknowledged data packet set.

Further, optionally, as shown in FIG. 8, it is assumed that TCP-layer data packets that are determined by the RAN side device the $(N-2)^{th}$ time after the RAN side device receives the link layer ACK and that correspond to link layer data packets successfully received by the user equipment include the TCP-layer data packet whose sequence number is 1 (that is, the TCP-layer data packet 1), the TCP-layer data packet whose sequence number is 2 (that is, the TCP-layer data packet 2), and the TCP-layer data packet whose sequence number is 3 (that is, the TCP-layer data packet 3). In this case, the continuity-acknowledged data packet is the TCP-layer data packet 3, and no information about any TCP-layer data packet is added to the discontinuity-acknowledged data packet set. The RAN side device may use the sum of the sequence number 3 of the TCP-layer data packet 3 and the packet length of the TCP-layer data packet 3 as the sequence number of the to-be-constructed TCP-layer ACK, to construct the TCP-layer ACK, and perform S316: The RAN side device sends the constructed TCP-layer ACK to the application server.

The TCP-layer data packets that are determined by the RAN side device the $(N-1)^{th}$ time after the RAN side device receives the link layer ACK and that correspond to the link layer data packets successfully received by the user equipment include the TCP-layer data packet whose sequence number is 5 (that is, the TCP-layer data packet 5) and the TCP-layer data packet whose sequence number is 7 (that is, the TCP-layer data packet 7). In this case, the RAN side device does not update the continuity-acknowledged data packet, the continuity-acknowledged data packet is still the TCP-layer data packet 3, and the RAN side device adds the information about the TCP-layer data packet 5 and the information about the TCP-layer data packet 7 to the discontinuity-acknowledged data packet set. Because the continuity-acknowledged data packet is not updated, the RAN side device may not construct the corresponding TCP-layer ACK the $(N-1)^{th}$ time after receiving the link layer ACK, or the RAN side device may use the sum of the sequence number 3 of the TCP-layer data packet 3 and the packet length of the TCP-layer data packet 3 as the sequence number of the TCP-layer ACK, to construct the TCP-layer ACK, and then, does not perform step S316: Send the constructed TCP-layer ACK to the application server.

In case 1 in FIG. 8, the TCP-layer data packets that are determined by the RAN side device the $N^{th}$ time after the RAN side device receives the link layer ACK and that correspond to the link layer data packets successfully received by the user equipment include the TCP-layer data packet whose sequence number is 4 (that is, the TCP-layer data packet 4) and the TCP-layer data packet whose sequence number is 6 (that is, the TCP-layer data packet 6). In this case, the RAN side device updates the continuity-acknowledged data packet to the TCP-layer data packet 7, and the RAN side device deletes the information about the TCP-layer data packet 5 and the information about the TCP-layer data packet 7 from the discontinuity-acknowledged data packet set. The RAN side device may use a sum of the sequence number 7 of the TCP-layer data packet 7 and a packet length of the TCP-layer data packet 7 as the sequence number of the to-be-constructed TCP-layer ACK, to construct the TCP-layer ACK, and perform S316: The RAN side device sends the constructed TCP-layer ACK to the application server.

In case 2 in FIG. 8, the TCP-layer data packets that are determined by the RAN side device the $N^{th}$ time after the RAN side device receives the link layer ACK and that correspond to the link layer data packets successfully received by the user equipment include the TCP-layer data packet whose sequence number is 4 (that is, the TCP-layer data packet 4) and a TCP-layer data packet whose sequence number is 8 (that is, a TCP-layer data packet 8). In this case, the RAN side device updates the continuity-acknowledged data packet to the TCP-layer data packet 5, and the RAN side device adds information about the TCP-layer data packet 8 to the discontinuity-acknowledged data packet set, and RAN side device deletes the information about the TCP-layer data packet 5 from the discontinuity-acknowledged data packet set. The RAN side device may use a sum of the sequence number 5 of the TCP-layer data packet 5 and a packet length of the TCP-layer data packet 5 as the sequence number of the to-be-constructed TCP-layer ACK, to construct the TCP-layer ACK, and perform S316: The RAN side device sends the constructed TCP-layer ACK to the application server.

Exemplarily, in another application scenario of this embodiment of the present invention, the category of ACK interception of which is supported by both the user equipment and the RAN side device is the second interception category (in the second interception category, the sequence number of the TCP-layer ACK is equal to the first sequence number, and the first sequence number records a sequence number of a latest ACK updated in the buffer of the downlink link layer data packets).

In this application scenario, for details of S315*b*, refer to related descriptions when the category of ACK interception of which is supported by both the user equipment and the RAN side device is the first interception category. A difference is: In step A and step B, each time the RAN side device updates the continuity-acknowledged data packet (step A: The RAN side device uses the first data packet as the continuity-acknowledged data packet; step B: Use the fourth data packet as the continuity-acknowledged data packet), the RAN side device needs to clear decision counting of an ACK used to construct the second interception category; in addition, in step A' and step B, each time the RAN side device adds information about one data packet to the discontinuity-acknowledged data packet set, the RAN side device needs to add one to the decision counting of the ACK used to construct the second interception category, and if the RAN side device adds information about N new data packets to the discontinuity-acknowledged data packet set, the RAN side device needs to add N to the decision counting of the ACK used to construct the second interception category.

S315*c*: The RAN side device re-sends, according to the sequence number of the TCP-layer data packet corresponding to the link layer data packet that the user equipment does not successfully receive, the link layer data packet that is not successfully received to the user equipment.

S316: The RAN side device sends the constructed TCP-layer ACK to the application server.

The constructed TCP-layer ACK is used to indicate to the application server that the corresponding TCP-layer data packet is already received by the user equipment.

In the data transmission method provided in this embodiment of the present invention, user equipment obtains a TCP-layer ACK; and intercepts the TCP-layer ACK if a TCP-layer data packet corresponding to the TCP-layer ACK is a TCP-layer data packet that is obtained by the user equipment after the user equipment parses a link layer data packet received through a radio air interface link by the user equipment, and the TCP-layer ACK satisfies a preset condition.

Compared with the prior art that a large amount of TCP-layer ACK packet transmission occupies radio air interface link resources and increases consumption of radio air interface link resources, in this solution, the user equipment may perform interception decision on the TCP-layer ACK, and when the TCP-layer ACK satisfies the preset condition, intercept the TCP-layer ACK, that is, does not send the TCP-layer ACK to a RAN side device; the RAN side device may determine, according to a link layer ACK received from the user equipment, that the user equipment already receives the TCP-layer data packet. Therefore, a quantity of TCP-layer ACK packets transmitted on the radio air interface link between the user equipment and the RAN side device can be reduced without affecting a TCP acknowledgement mechanism between the user equipment and the RAN side device, thereby reducing consumption of radio air interface link resources, improving transmission efficiency of radio service data, and improving a capacity of a radio communications system.

Embodiment 4

This embodiment of the present invention provides a data transmission method, which may be applied to a downlink data transmission process based on a TCP connection, that is, a first device is specifically user equipment and a second device is specifically a RAN side device.

This embodiment further describes the method in the embodiments of the present invention by using an example in which when there is a TCP agent of a Split TCP type in the RAN side device, the RAN side device transmits downlink data to the user equipment.

Figure 5A:
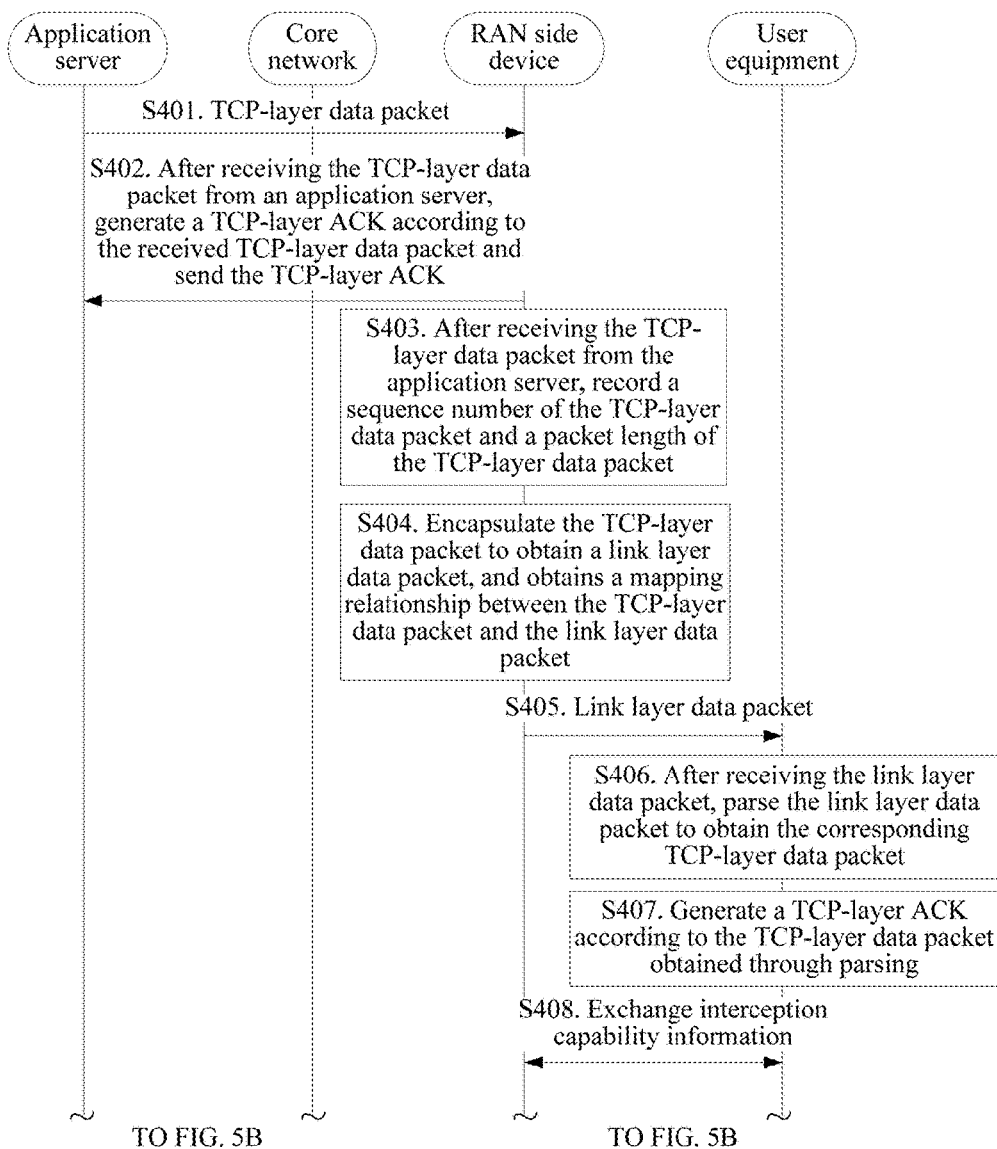
FIG. 5A and FIG. 5B are a flowchart of a data transmission method according to Embodiment 4 of the present invention.
Figure 5B:
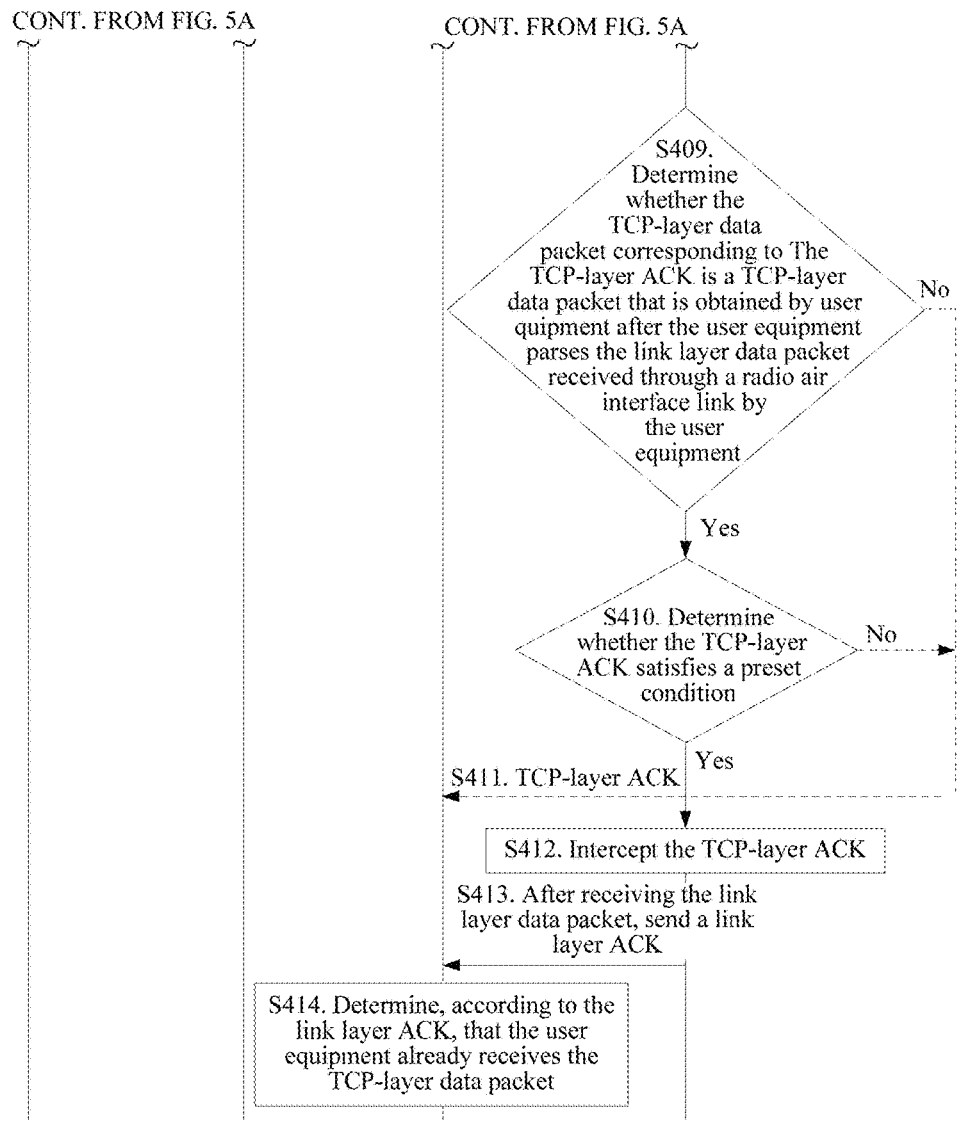

Specifically, as shown in FIG. 5A and FIG. 5B, the data transmission method may include:

S401: The RAN side device receives a TCP-layer data packet from an application server.

S402: After receiving the TCP-layer data packet from the application server, the RAN side device generates a TCP-layer ACK according to the received TCP-layer data packet and sends the TCP-layer ACK to the application server.

The TCP-layer ACK is used to indicate to the application server that the RAN side device already receives the TCP-layer data packet from the application server.

It should be noted that, for a method for generating, by the RAN side device, the TCP-layer ACK according to the received TCP-layer data packet, refer to a specific method for generating, by a device, a TCP-layer ACK after a TCP-layer data packet is received in the prior art, and details are not described in this embodiment.

S403: After receiving the TCP-layer data packet from the application server, the RAN side device records a sequence number of the TCP-layer data packet and a packet length of the TCP-layer data packet.

S404: The RAN side device encapsulates the TCP-layer data packet to obtain a link layer data packet, and obtains a mapping relationship between the TCP-layer data packet and the link layer data packet.

The mapping relationship between the TCP-layer data packet and the link layer data packet includes at least: a mapping relationship between the sequence number of the TCP-layer data packet and a sequence number of the link layer data packet.

It should be noted that, for a specific method for encapsulating, by the RAN side device, the TCP-layer data packet into the link layer data packet, refer to corresponding descriptions of data packet encapsulation in the prior art, and details are not described in this embodiment.

It should be noted that, in this embodiment of the present invention, S402 may be performed first and S403 and S404 are performed then; or S403 and S404 may be performed first and S402 is performed then; or S402 and S403 and S404 may be performed at the same time. This embodiment of the present invention does not limit a sequence between S402 and S403 and S404.

S405: The RAN side device sends the link layer data packet to the user equipment.

S406: After receiving the link layer data packet, the user equipment parses the link layer data packet to obtain the corresponding TCP-layer data packet.

S407: The user equipment generates a TCP-layer ACK according to the TCP-layer data packet obtained through parsing.

It should be noted that, in this embodiment of the present invention, for a specific method in which after receiving the link layer data packet, the user equipment parses the link layer data packet to obtain the corresponding TCP-layer data packet, and generates the TCP-layer ACK according to the TCP-layer data packet obtained through parsing, refer to related descriptions in Embodiment 3 in which after receiving the link layer data packet, the user equipment parses the link layer data packet to obtain the corresponding the TCP-layer data packet, and generates the TCP-layer ACK according to the TCP-layer data packet obtained through parsing, and details are not described in this embodiment again.

Further, optionally, in this embodiment of the present invention, after generating the TCP-layer ACK, the user equipment needs to determine whether the TCP-layer ACK satisfies a preset condition, and then, determine, according to a determining result, whether to intercept the TCP-layer ACK. The RAN needs to determine operation processing that the RAN side device needs to perform after the user equipment intercepts the TCP-layer ACK, that is, the RAN side device and the user equipment need to exchange statuses of supporting an interception capability. Therefore, the method in this embodiment of the present invention may further include:

S408: The user equipment and the RAN side device exchange interception capability information, where the interception capability information includes: a category of ACK interception of which is supported by both the user equipment and the RAN side device and an interception parameter that is supported by both the user equipment and the RAN side device.

It should be noted that, a specific method for exchanging the interception capability information by the user equipment and the RAN side device is similar to the method for exchanging the interception capability information by the user equipment and the RAN side device in Embodiment 3. Therefore, refer to the specific descriptions of exchanging the interception capability information by the user equipment and the RAN side device in Embodiment 3, and details are not described in this embodiment again.

S409: The user equipment determines whether the TCP-layer data packet corresponding to the TCP-layer ACK is a TCP-layer data packet that is obtained by the user equipment after the user equipment parses the link layer data packet received through a radio air interface link by the user equipment.

Specifically, if the TCP-layer data packet corresponding to the TCP-layer ACK is the TCP-layer data packet that is obtained by the user equipment after the user equipment parses the link layer data packet received through the radio air interface link by the user equipment, S410 is performed; or if the TCP-layer data packet corresponding to the TCP-layer ACK is not the TCP-layer data packet that is obtained by the user equipment after the user equipment parses the link layer data packet received through the radio air interface link by the user equipment, S411 is performed.

S410: The user equipment determines whether the TCP-layer ACK satisfies a preset condition.

It should be noted that, in this embodiment of the present invention, for a method for determining, by the user equipment, whether the TCP-layer ACK satisfies the preset condition, and deployment of an interception module, refer to related descriptions in Embodiment 3, and details are not described in this embodiment again.

Specifically, if the TCP-layer ACK satisfies the preset condition, S412 is directly performed (that is, the TCP-layer ACK is intercepted); or if the TCP-layer ACK does not satisfy the preset condition, S411 is performed.

S411: The user equipment sends the TCP-layer ACK to the RAN side device.

S412: The user equipment intercepts the TCP-layer ACK.

It should be noted that, a specific method for intercepting, by the user equipment, the TCP-layer ACK in this embodiment of the present invention is similar to the method for intercepting, by the user equipment, the TCP-layer ACK in Embodiment 3. Therefore, refer to related descriptions of intercepting, by the user equipment, the TCP-layer ACK in Embodiment 3, and details are not described in this embodiment again.

S413: After receiving the link layer data packet, the user equipment sends a link layer ACK to the RAN side device.

It should be noted that, in this embodiment of the present invention, S406 may be performed first and S413 is performed then; or S413 may be performed first and S406 is performed then; or S406 and S413 may be performed at the same time. This embodiment of the present invention does not limit a sequence between S406 and S413.

S414: The RAN side device determines, according to the link layer ACK, that the user equipment already receives the TCP-layer data packet.

It should be noted that, in this embodiment, a specific method for determining, by the RAN side device according to the link layer ACK, that the user equipment already receives the TCP-layer data packet is similar to the method for determining, by the RAN side device according to the link layer ACK, that the user equipment already receives the TCP-layer data packet in Embodiment 3. Therefore, refer to related descriptions of determining, by the RAN side device according to the link layer ACK, that the user equipment already receives the TCP-layer data packet in Embodiment 3, and details are not described in this embodiment again.

It should be noted that, in this embodiment, there is a TCP agent of a Split TCP type in the RAN side device. When there is the TCP agent of the Split TCP type in the RAN side device, after receiving the TCP-layer data packet from the application server, the RAN side device may directly reply to the application server with the corresponding TCP-layer ACK. Therefore, when the RAN side device sends the TCP-layer data packet to the user equipment and determines that the user equipment already receives the TCP-layer data packet, the RAN side device does not need to reply to application server with the corresponding TCP-layer ACK again.

Therefore, in this embodiment, after determining that the user equipment already receives the TCP-layer data packet, the RAN side device does not need to construct a TCP-layer ACK that is used to indicate to the application server that the TCP-layer data packet is already successfully sent to the user equipment.

In the data transmission method provided in this embodiment of the present invention, user equipment obtains a TCP-layer ACK; and intercepts the TCP-layer ACK if a TCP-layer data packet corresponding to the TCP-layer ACK is a TCP-layer data packet that is obtained by the user equipment after the user equipment parses a link layer data packet received through a radio air interface link by the user equipment, and the TCP-layer ACK satisfies a preset condition.

Compared with the prior art that a large amount of TCP-layer ACK packet transmission occupies radio air interface link resources and increases consumption of radio air interface link resources, in this solution, the user equipment may perform interception decision on the TCP-layer ACK, and when the TCP-layer ACK satisfies the preset condition, intercept the TCP-layer ACK, that is, does not send the TCP-layer ACK to a RAN side device; the RAN side device may determine, according to a link layer ACK received from the user equipment, that the user equipment already receives the TCP-layer data packet. Therefore, a quantity of TCP-layer ACK packets transmitted on the radio air interface link between the user equipment and the RAN side device can be reduced without affecting a TCP acknowledgement mechanism between the user equipment and the RAN side device, thereby reducing consumption of radio air interface link resources, improving transmission efficiency of radio service data, and improving a capacity of a radio communications system.

Embodiment 5

This embodiment of the present invention provides a data transmission method, which may be applied to an uplink data transmission process based on a TCP connection, that is, a first device is specifically a RAN side device and a second device is specifically user equipment.

Figure 9:
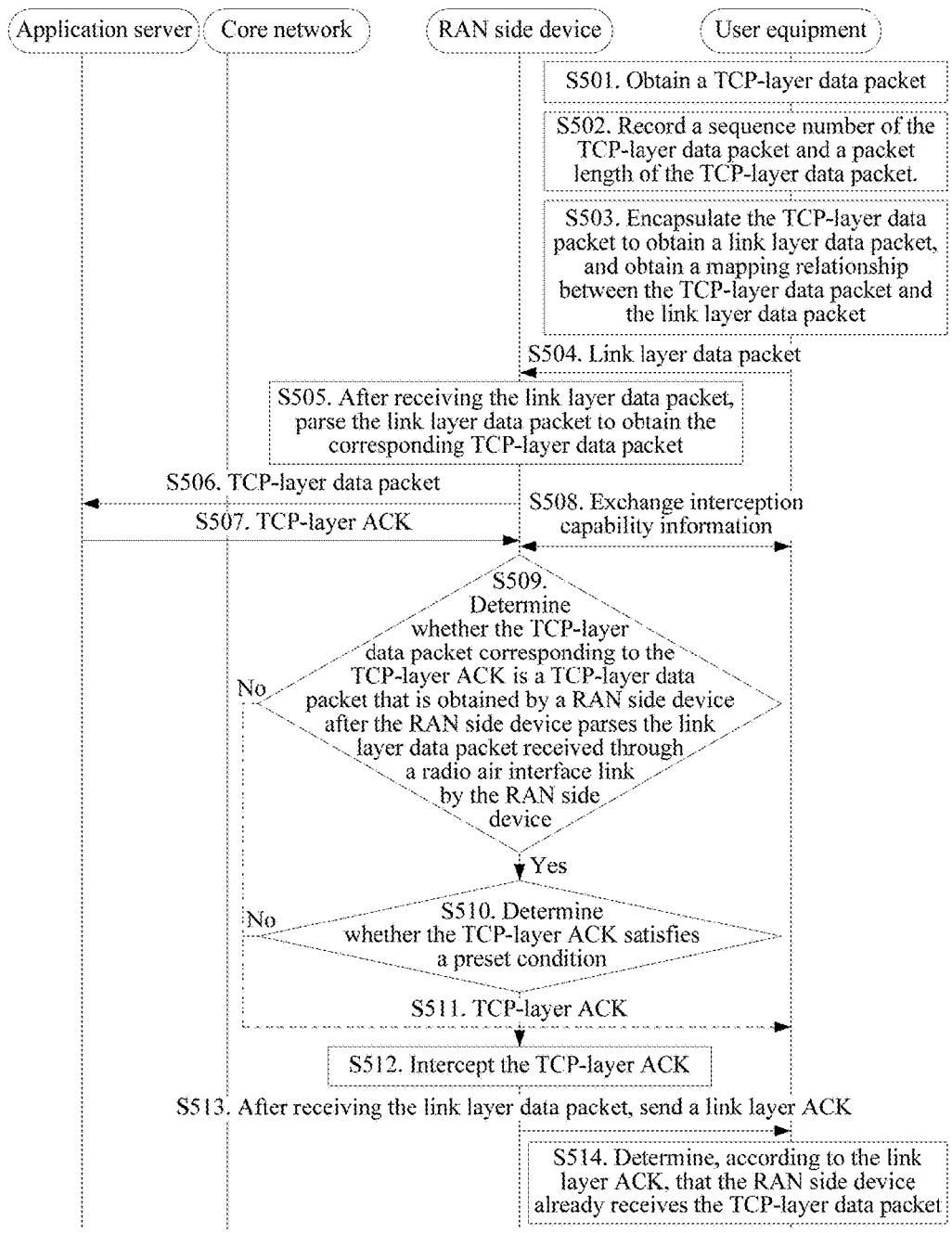
FIG. 9 is a flowchart of a data transmission method according to Embodiment 5 of the present invention.

Specifically, as shown in FIG. 9, the data transmission method may include:

S501: The user equipment obtains a TCP-layer data packet.

S502: The user equipment records a sequence number of the TCP-layer data packet and a packet length of the TCP-layer data packet.

S503: The user equipment encapsulates the TCP-layer data packet to obtain a link layer data packet, and obtains a mapping relationship between the TCP-layer data packet and the link layer data packet.

Packet data information of the TCP-layer data packet includes: the sequence number of the TCP-layer data packet, the packet length of the TCP-layer data packet, and a mapping relationship between the sequence number of the TCP-layer data packet and a sequence number of the link layer data packet.

It should be noted that, for a specific method for encapsulating, by the user equipment, the TCP-layer data packet into the link layer data packet, refer to corresponding descriptions of data packet encapsulation in the prior art, and details are not described in this embodiment.

S504: The user equipment sends the link layer data packet to the RAN side device.

S505: After receiving the link layer data packet, the RAN side device parses the link layer data packet to obtain the corresponding TCP-layer data packet.

S506: The RAN side device sends the TCP-layer data packet to an application server.

It should be noted that, in a first application scenario of this embodiment, a radio air interface link between the RAN side device and the user equipment may be a 3GPP link, that is, data is transmitted between the RAN side device and the user equipment by means of a 3GPP air interface.

In the first application scenario, the RAN side device may include a processing entity of a TCP IP protocol stack and a processing entity of a 3GPP air interface protocol stack. The RAN side device may receive the link layer data packet from the user equipment by using the processing entity of the 3GPP air interface protocol stack in the RAN side device, parse the link layer data packet to obtain the corresponding TCP-layer data packet, and then, transmit the TCP-layer data packet obtained through parsing to the processing entity of the TCP IP protocol stack in the RAN side device. The RAN side device sends the TCP-layer data packet to the application server by using the processing entity of the TCP IP protocol stack.

It should be noted that, in a second application scenario of this embodiment, a radio air interface link between the RAN side device and the user equipment may be a WiFi link, that is, data is transmitted between the RAN side device and the user equipment by means of a WiFi air interface.

In the second application scenario, the RAN side device may include a processing entity of a TCP IP protocol stack and a processing entity of a WiFi air interface protocol stack. The RAN side device may receive the link layer data packet from the user equipment by using the processing entity of the WiFi air interface protocol stack in the RAN side device, parse the link layer data packet to obtain the corresponding TCP-layer data packet, and then, transmit the TCP-layer data packet obtained through parsing to the processing entity of the TCP IP protocol stack in the RAN side device. The RAN side device sends the TCP-layer data packet to the application server by using the processing entity of the TCP IP protocol stack.

It should be noted that, a TCP-layer data packet corresponding to a TCP-layer ACK may be a TCP-layer data packet that is obtained by the RAN side device after the RAN side device parses the link layer data packet received through the radio air interface link by the RAN side device; or the TCP-layer data packet corresponding to the TCP-layer ACK may be a TCP-layer data packet that is obtained by the RAN side device after the RAN side device parses the link layer data packet received through a wired link by the RAN side device. Because in this embodiment of the present invention, interception decision is performed on only the TCP-layer data packet of the link layer data packet received through the radio air interface link by the RAN side device, this embodiment describes only a specific process of generating the TCP-layer ACK according to the TCP-layer data packet of the link layer data packet received through the radio air interface link.

S507: The RAN side device receives a TCP-layer ACK from the application server.

Further, optionally, in this embodiment of the present invention, after receiving the TCP-layer ACK from the application server, the RAN side device needs to determine whether the TCP-layer ACK satisfies a preset condition, and then, determines, according to a determining result, whether to intercept the TCP-layer ACK. The RAN side device needs to determine operation processing that the user equipment needs to perform after the RAN side device intercepts the TCP-layer ACK, that is, the user equipment and the RAN side device need to exchange statuses of supporting an interception capability. Therefore, the method in this embodiment of the present invention may further include:

S508: The user equipment and the RAN side device exchange interception capability information, where the interception capability information includes: a category of ACK interception of which is supported by both the user equipment and the RAN side device and an interception parameter that is supported by both the user equipment and the RAN side device.

It should be noted that, in this embodiment, for a specific method for exchanging, by the user equipment and the RAN side device, the interception capability information, refer to related descriptions in Embodiment 3 of the present invention, and details are not described in this embodiment again.

It should be noted that, in this embodiment of the present invention, S501 to S507 may be performed first and S508 is performed then; or S508 may be performed first and S501 to S507 are performed then; or S501 to S507 and S508 may be performed at the same time. This embodiment of the present invention does not limit a sequence between S501 to S507 and S508.

S509: The RAN side device determines whether the TCP-layer data packet corresponding to the TCP-layer ACK is a TCP-layer data packet that is obtained by the RAN side device after the RAN side device parses the link layer data packet received through a radio air interface link by the RAN side device.

Specifically, if the TCP-layer data packet corresponding to the TCP-layer ACK is the TCP-layer data packet that is obtained by the RAN side device after the RAN side device parses the link layer data packet received through the radio air interface link by the RAN side device, S510 is performed; or if the TCP-layer data packet corresponding to the TCP-layer ACK is not the TCP-layer data packet that is obtained by the RAN side device after the RAN side device parses the link layer data packet received through the radio air interface link by the RAN side device, S511 is performed.

S510: The RAN side device determines whether the TCP-layer ACK satisfies a preset condition.

It should be noted that, for a specific method for determining, by the RAN side device, whether the TCP-layer ACK satisfies the preset condition in this embodiment, refer to the method for determining, by the user equipment, whether the TCP-layer ACK satisfies the preset condition in the foregoing embodiment of the present invention, and details are not described in this embodiment again.

It should be noted that, in this embodiment of the present invention, for deployment of an interception module in the RAN side device, refer to related descriptions of the deployment of the interception module in the user equipment in Embodiment 3, and details are not described in this embodiment again.

Specifically, if the TCP-layer ACK satisfies the preset condition, S512 is directly performed (that is, the TCP-layer ACK is intercepted); or if the TCP-layer ACK does not satisfy the preset condition, S511 is performed.

S511: The RAN side device sends the TCP-layer ACK to the user equipment.

S512: The RAN side device intercepts the TCP-layer ACK.

Specifically, the RAN side device may implement interception decision on the TCP-layer ACK by using the interception module configured in the RAN side device.

In the first application scenario of this embodiment, the radio air interface link between the RAN side device and the user equipment may be the 3GPP link, and data is transmitted between the RAN side device and the user equipment by means of the 3GPP air interface, that is, the RAN side device is a 3GPP link-enabled terminal. The RAN side device includes the processing entity of the TCP IP protocol stack and the processing entity of the 3GPP air interface protocol stack.

Preferably, in one case of the first application scenario, the interception module may be deployed on a TCP layer or an IP layer of the processing entity of the TCP IP protocol stack.

In this case, the processing entity of the TCP IP protocol stack implements interception decision on the TCP-layer ACK; and when the TCP-layer ACK satisfies the preset condition, the processing entity of the TCP IP protocol stack intercepts the TCP-layer ACK and does not transmit the TCP-layer ACK to the processing entity of the 3GPP air interface protocol stack; or when the TCP-layer ACK does not satisfy the preset condition, the processing entity of the TCP IP protocol stack transmits the TCP-layer ACK to the processing entity of the 3GPP air interface protocol stack.

Optionally, in another case of the first application scenario, the interception module may be deployed on a protocol layer, which is the first to process air interface uplink data, of the processing entity of the 3GPP air interface protocol stack. For example, on an LTE network and a UMTS network, the interception module may be deployed on a PDCP layer of the processing entity of the 3GPP air interface protocol stack.

In this case, the processing entity of the 3GPP air interface protocol stack implements interception decision on the TCP-layer ACK. Specifically, after receiving the TCP-layer ACK from the processing entity of the TCP IP protocol stack, the processing entity of the 3GPP air interface protocol stack may perform interception decision on the TCP-layer ACK, and when the TCP-layer ACK satisfies the preset condition, intercept the TCP-layer ACK.

It should be noted that, when the RAN side device is a 3GPP link-enabled terminal, the TCP-layer ACK (the TCP-layer ACK) received by the interception module of the RAN side device may include ACKs corresponding to TCP-layer data packets from two links: 1) a TCP-layer ACK corresponding to a TCP-layer data packet from a wired link (when a wired TCP connection exists between the RAN side device and the user equipment); and 2) a TCP-layer ACK corresponding to an air interface downlink TCP-layer data packet from a 3GPP link. Therefore, the RAN side device needs to determine whether the TCP-layer data packet corresponding to the TCP-layer ACK is a TCP-layer data packet received through the radio air interface link; when the TCP-layer data packet corresponding to the TCP-layer ACK is a TCP-layer data packet received through the radio air interface link (the 3GPP radio air interface link), the RAN side device further determines whether the TCP-layer ACK satisfies a filter criterion (a first filter criterion, or a first filter criterion and a second filter criterion); and when the TCP-layer data packet corresponding to the TCP-layer ACK is a TCP-layer data packet received through a wired link, the RAN side device does not intercept the TCP-layer ACK.

In the second application scenario of this embodiment, the RAN side device includes the processing entity of the TCP IP protocol stack and the processing entity of the WiFi air interface protocol stack.

Preferably, in one case of the second application scenario, the interception module may be deployed on a TCP layer or an IP layer of the processing entity of the TCP IP protocol stack.

In this case, the processing entity of the TCP IP protocol stack implements interception decision on the TCP-layer ACK; and when the TCP-layer ACK satisfies the preset condition, the processing entity of the TCP IP protocol stack intercepts the TCP-layer ACK and does not transmit the TCP-layer ACK to the processing entity of the WiFi air interface protocol stack; or when the TCP-layer ACK does not satisfy the preset condition, the processing entity of the TCP IP protocol stack transmits the TCP-layer ACK to the processing entity of the WiFi air interface protocol stack.

Optionally, in another case of the second application scenario, the radio air interface link between the RAN side device and the user equipment may be the WiFi link, and data is transmitted between the RAN side device and the user equipment by means of the WiFi air interface, that is, the user equipment is a WiFi link-enabled terminal. The interception module may be deployed on a protocol layer, which is the first to process air interface uplink data, of the processing entity of the WiFi air interface protocol stack. For example, the interception module may be deployed on a MAC layer of the processing entity of the WiFi air interface protocol stack.

In this case, the processing entity of the WiFi air interface protocol stack implements interception decision on the TCP-layer ACK. Specifically, after receiving the TCP-layer ACK from the processing entity of the TCP IP protocol stack, the processing entity of the WiFi air interface protocol stack may perform interception decision on the TCP-layer ACK, and when the TCP-layer ACK satisfies the preset condition, intercept the TCP-layer ACK and does not encapsulate or send the TCP-layer ACK.

It should be noted that, when the RAN side device is a WiFi link-enabled terminal, the TCP-layer ACK (the TCP-layer ACK) received by the interception module of the RAN side device may include ACKs corresponding to TCP-layer data packets from two links: 1) a TCP-layer ACK corresponding to a TCP-layer data packet from a wired link (when a wired TCP connection exists between the RAN side device and the user equipment); and 2) a TCP-layer ACK corresponding to an air interface downlink TCP-layer data packet from a WiFi link. Therefore, the RAN side device needs to determine whether the TCP-layer data packet corresponding to the TCP-layer ACK is a TCP-layer data packet received through the radio air interface link; when the TCP-layer data packet corresponding to the TCP-layer ACK is the TCP-layer data packet received through the radio air interface link (the WiFi radio air interface link), the RAN side device further determines whether the TCP-layer ACK satisfies a filter criterion (a first filter criterion, or a first filter criterion and a second filter criterion); and when the TCP-layer data packet corresponding to the TCP-layer ACK is a TCP-layer data packet received through a wired link, the RAN side device does not intercept the TCP-layer ACK.

Further, when the RAN side device is a wireless concurrency-enabled terminal (that is, not only the WiFi radio air interface link but also the 3GPP radio air interface link is established between the RAN side device and the user equipment), the TCP-layer ACK received by the interception module of the RAN side device may be ACKs corresponding to TCP-layer data packets from three links: 1) a TCP-layer ACK corresponding to a TCP-layer data packet from a wired link (when there is a wired TCP connection between the RAN side device and the user equipment); 2) a TCP-layer ACK corresponding to an air interface downlink TCP-layer data packet from a WiFi link; and 3) a TCP-layer ACK corresponding to an air interface downlink TCP-layer data packet from a 3GPP link. Therefore, the RAN side device needs to determine whether the TCP-layer data packet corresponding to the TCP-layer ACK is a TCP-layer data packet received through the radio air interface link (the WiFi radio air interface link or the 3GPP radio air interface link); when the TCP-layer data packet corresponding to the TCP-layer ACK is a TCP-layer data packet received through the radio air interface link, the RAN side device further determines whether the TCP-layer ACK satisfies a filter criterion (a first filter criterion, or a first filter criterion and a second filter criterion); and when the TCP-layer data packet corresponding to the TCP-layer ACK is a TCP-layer data packet received through the wired link, the RAN side device does not intercept the TCP-layer ACK.

It should be noted that when the RAN side device is a wireless concurrency-enabled terminal, the interception module is generally deployed on the processing entity of the TCP IP protocol stack. Specifically, when the interception module is generally deployed on the processing entity of the 3GPP air interface protocol stack or the processing entity of the WiFi air interface protocol stack in the RAN side device, the processing entity of the 3GPP air interface protocol stack and the processing entity of the WiFi air interface protocol stack cannot obtain packet data information of a downlink TCP-layer data packet in a concurrent scenario. Therefore, information needs to be exchanged by means of an effective and high-speed data transmission channel, which has complex implementation. The processing entity of the TCP IP protocol stack is an aggregation point of multiple links (a transmission link of a downlink TCP-layer data packet and an uplink TCP-layer ACK), and when the interception module is deployed on the processing entity of the TCP IP protocol stack, processing entities do not need to exchange information, which can simplify a processing process.

Based on a link layer acknowledgement mechanism, after receiving the link layer data packet, the RAN side device may reply to the user equipment with a link layer ACK.

S513: After receiving the link layer data packet, the RAN side device sends a link layer ACK to the user equipment.

S514: The user equipment determines, according to the link layer ACK, that the RAN side device already receives the TCP-layer data packet.

It should be noted that, in this embodiment, a specific method for determining, by the user equipment according to the link layer ACK, that the RAN side device already receives the TCP-layer data packet is similar to the method for determining, by the RAN side device according to the link layer ACK, that the user equipment already receives the TCP-layer data packet in Embodiment 3. Therefore, refer to related descriptions of determining, by the RAN side device according to the link layer ACK, that the user equipment already receives the TCP-layer data packet in Embodiment 3, and details are not described in this embodiment again.

In the data transmission method provided in this embodiment of the present invention, a first device obtains a TCP-layer ACK; and intercepts the TCP-layer ACK if a TCP-layer data packet corresponding to the TCP-layer ACK is a TCP-layer data packet that is obtained by the first device after the first device parses a link layer data packet received through a radio air interface link by the first device, and the TCP-layer ACK satisfies a preset condition.

Compared with the prior art that a large amount of TCP-layer ACK packet transmission occupies radio air interface link resources and increases consumption of radio air interface link resources, in this solution, the first device may perform interception decision on the TCP-layer ACK, and when the TCP-layer ACK satisfies the preset condition, intercept the TCP-layer ACK, that is, does not send the TCP-layer ACK to a second device; the second device may determine, according to a link layer ACK received from the first device, that the first device already receives the TCP-layer data packet. Therefore, a quantity of TCP-layer ACK packets transmitted on the radio air interface link between the first device and the second device can be reduced without affecting a TCP acknowledgement mechanism between the first device and the second device, thereby reducing consumption of radio air interface link resources, improving transmission efficiency of radio service data, and improving a capacity of a radio communications system.

Embodiment 6

Figure 11:
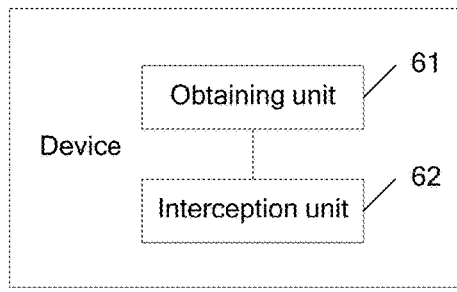
FIG. 11 is a schematic structural diagram of a device according to Embodiment 6 of the present invention.

This embodiment of the present invention provides a device. As shown in FIG. 11, the device includes an obtaining unit 61 and an interception unit 62, where the obtaining unit 61 is configured to obtain a Transmission Control Protocol TCP-layer acknowledgement ACK; and the interception unit 62 is configured to intercept the TCP-layer ACK if a TCP-layer data packet corresponding to the TCP-layer ACK obtained by the obtaining unit 61 is a TCP-layer data packet that is obtained by the device after the device parses a link layer data packet received through a radio air interface link by the device, and the TCP-layer ACK satisfies a preset condition, where that the TCP-layer ACK satisfies the preset condition includes: the TCP-layer ACK does not satisfy at least one filter condition in a first filter criterion, and the TCP-layer ACK belongs to at least one of a first interception category or a second interception category.

Figure 12:
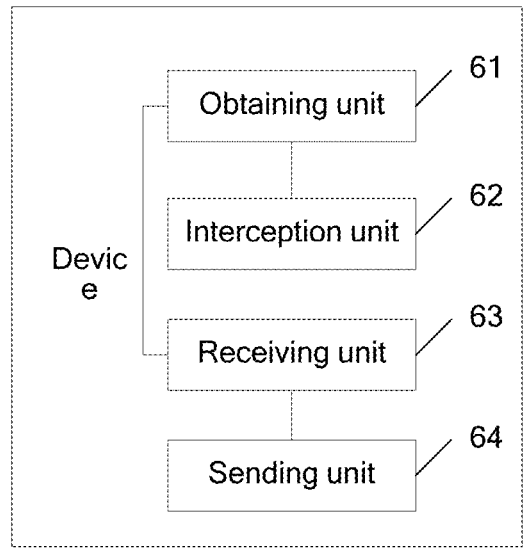
FIG. 12 is a schematic structural diagram of another device according to Embodiment 6 of the present invention.

Further, as shown in FIG. 12, the device may further include a receiving unit 63 and a sending unit 64, where the receiving unit 63 is configured to receive the link layer data packet from a second device through the radio air interface link; and the sending unit 64 is configured to: after the receiving unit 63 receives the link layer data packet from the second device through the radio air interface link, send a link layer ACK to the second device, so that the second device determines, according to the link layer ACK, that the device already receives the TCP-layer data packet.

Further, the sending unit 64 is configured to: if the TCP-layer data packet corresponding to the TCP-layer ACK obtained by the obtaining unit 61 is not the TCP-layer data packet that is obtained by the device after the device parses the link layer data packet received through the radio air interface link by the device, send the TCP-layer ACK to the second device; or the sending unit 64 is further configured to: if the TCP-layer data packet corresponding to the TCP-layer ACK obtained by the obtaining unit 61 is the TCP-layer data packet that is obtained by the device after the device parses the link layer data packet received through the radio air interface link by the device, and the TCP-layer ACK does not satisfy the preset condition, send the TCP-layer ACK to the second device.

Further, the first filter criterion includes at least: one of the following filter conditions or a combination of multiple filter conditions of the following filter conditions.

The filter conditions in the first filter criterion may be: the TCP-layer ACK is an ACK that is carried, after the device receives a link layer data packet, another data packet sent to the second device and that is sent to the second device in a delaying manner; the TCP-layer ACK is an ACK in which a SYN bit is not set to 1; the TCP-layer ACK carries a TCP maximum segment size option, a TCP window scale option, and a TCP Sack-permitted option; the TCP-layer ACK carries a TCP option related to the MPTCP protocol; and a receive window carried in the TCP-layer ACK is not less than a preset threshold.

Further, in the first interception category, a TCP-layer data packet corresponding to a sequence number of the TCP-layer ACK is not recorded in a buffer of TCP-layer data packets, and TCP-layer data packets corresponding to ACK sequence numbers before the sequence number of the TCP-layer ACK are all recorded in the buffer of the TCP-layer data packets.

In the second interception category, the sequence number of the TCP-layer ACK is equal to a first sequence number, and the first sequence number is updated once each time after a TCP-layer ACK is obtained but before the obtained TCP-layer ACK is intercepted.

Further, that the TCP-layer ACK satisfies the preset condition further includes: the TCP-layer ACK does not satisfy at least one filter condition in a second filter criterion.

The second filter criterion includes at least: one of the following filter conditions or a combination of multiple filter conditions of the following filter conditions.

The filter conditions in the second filter criterion may be: the TCP-layer ACK carries a TCP timestamps option; and the TCP-layer ACK carries a TCP Sack option.

Further, the receiving unit 63 is configured to: before the obtaining unit 61 obtains the TCP-layer ACK, receive first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK.

Figure 13:
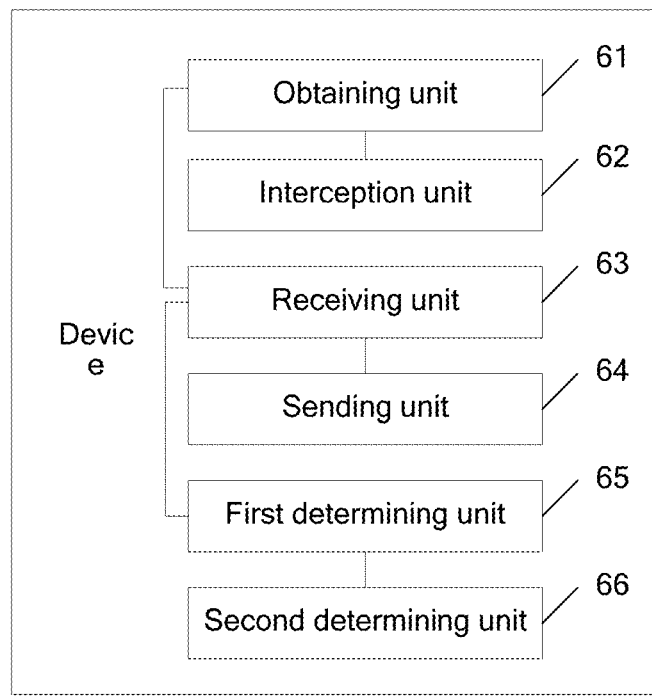
FIG. 13 is a schematic structural diagram of another device according to Embodiment 6 of the present invention.

As shown in FIG. 13, the device may further include a first determining unit 65 and a second determining unit 66, where the first determining unit 65 is configured to: determine an ACK category intersection according to the first interception operation received by the receiving unit 63 and a second ACK category, and determine an interception parameter intersection according to the first interception parameter received by the receiving unit 63 and a second interception parameter, where the ACK category intersection is an intersection of the first ACK category and the second ACK category, the interception parameter intersection is an intersection of the first interception parameter and the second interception parameter, the second ACK category is an ACK category to which a TCP-layer ACK that is intercepted by the device when the device makes interception decision belongs, the second ACK category includes the first interception category and/or the second interception category, the second interception parameter is an interception parameter used when the device makes interception decision, and the second interception parameter includes at least a preset threshold of the receive window carried in the TCP-layer ACK;

the second determining unit 66 is configured to: determine, according to the ACK category intersection determined by the first determining unit 65, a category of ACK interception of which is supported by both the device and the second device, and determine, according to the interception parameter intersection determined by the first determining unit 65, an interception parameter that is supported by both the device and the second device; and the sending unit 64 is configured to send second capability negotiation signaling to the second device, where the second capability negotiation signaling includes the second ACK category and the second interception parameter, where the second capability negotiation signaling is used to instruct the second device to obtain the ACK category intersection and the interception parameter intersection, and to further determine, according to the ACK category intersection, the category of ACK interception of which is supported by both the device and the second device, and determine, according to the interception parameter intersection, the interception parameter that is supported by both the device and the second device.

Further, the receiving unit 63 is configured to: before the obtaining unit 61 obtains the TCP-layer ACK, receive first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK.

Figure 14:
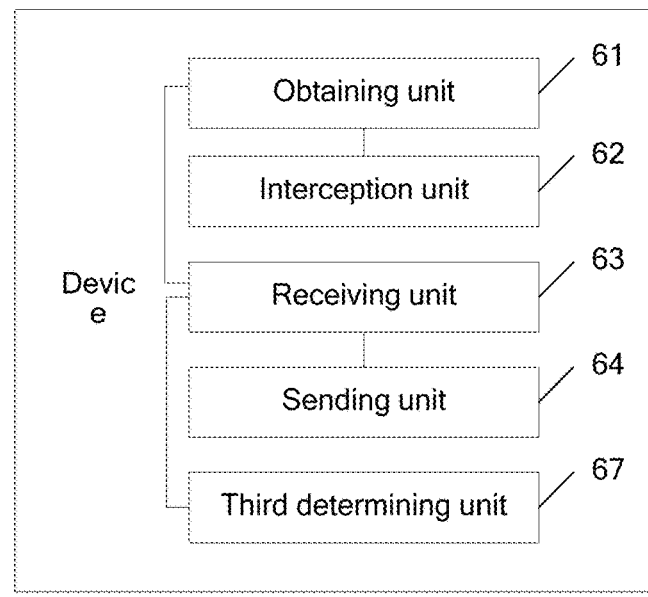
FIG. 14 is a schematic structural diagram of another device according to Embodiment 6 of the present invention.

As shown in FIG. 14, the device further includes a third determining unit 67, where the third determining unit 67 is configured to: determine, according to the first interception operation received by the receiving unit 63, a category of ACK interception of which is supported by the device, and determine, according to the first interception parameter received by the receiving unit, an interception parameter that is supported by the device.

Further, the device is user equipment and the second device is a radio access network RAN side device; or the device is a RAN side device and the second device is user equipment.

It should be noted that, for specific descriptions of some function modules in the first device provided in this embodiment of the present invention, refer to corresponding content in the method embodiment, and details are not described in this embodiment again.

The device (the first device) provided in this embodiment of the present invention may obtain a TCP-layer ACK; and intercept the TCP-layer ACK if a TCP-layer data packet corresponding to the TCP-layer ACK is a TCP-layer data packet that is obtained by the device after the device parses a link layer data packet received through a radio air interface link by the device, and the TCP-layer ACK satisfies a preset condition.

Compared with the prior art that a large amount of TCP-layer ACK packet transmission occupies radio air interface link resources and increases consumption of radio air interface link resources, in this solution, the device may perform interception decision on the TCP-layer ACK, and when the corresponding TCP-layer data packet is the TCP-layer data packet that is obtained by the first device after the first device parses the link layer data packet received through the radio air interface link by the device, and the TCP-layer ACK satisfies the preset condition, intercept the TCP-layer ACK, that is, does not send the TCP-layer ACK to a second device. Therefore, a quantity of TCP-layer ACK packets transmitted on the radio air interface link between the device and the second device can be reduced, thereby reducing consumption of radio air interface link resources, improving transmission efficiency of radio service data, and improving a capacity of a radio communications system.

Embodiment 7

Figure 15:
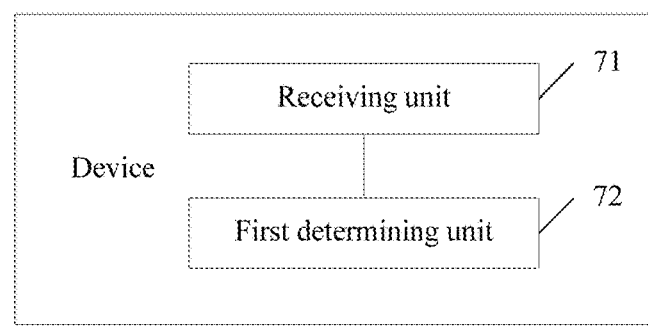
FIG. 15 is a schematic structural diagram of a device according to Embodiment 7 of the present invention.

This embodiment of the present invention provides a device. As shown in FIG. 15, the device includes a receiving unit 71 and a first determining unit 72, where the receiving unit 71 is configured to receive a link layer acknowledgement ACK from a first device, where the link layer ACK is sent by the first device after the first device receives a link layer data packet sent by the device; and the first determining unit 72 is configured to determine, according to the link layer ACK received by the receiving unit 71, that the first device already receives a TCP-layer data packet, where the TCP-layer data packet is obtained by the first device after the first device parses the link layer data packet.

Figure 16:
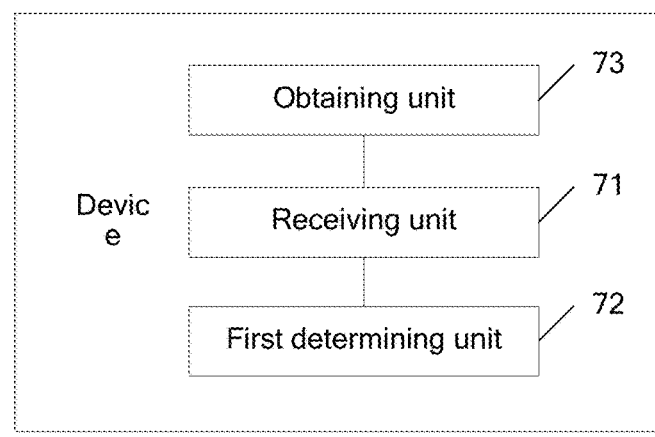
FIG. 16 is a schematic structural diagram of another device according to Embodiment 7 of the present invention.

Further, as shown in FIG. 16, the device may further include an obtaining unit 73, where the obtaining unit 73 is configured to: before the receiving unit 71 receives the link layer ACK from the first device, obtain a mapping relationship between the TCP-layer data packet and the link layer data packet, where the mapping relationship between the TCP-layer data packet and the link layer data packet includes at least: a mapping relationship between a sequence number of the TCP-layer data packet and a sequence number of the link layer data packet.

Further, the link layer ACK includes a sequence number of the link layer data packet corresponding to the link layer ACK; and the first determining unit 72 is further configured to determine, according to the sequence number of the link layer data packet and the mapping relationship between the sequence number of the TCP-layer data packet and the sequence number of the link layer data packet, a sequence number of the TCP-layer data packet corresponding to the link layer data packet successfully received by the first device, where the sequence number of the TCP-layer data packet corresponding to the link layer data packet successfully received by the first device is a sequence number of the TCP-layer data packet successfully received by the first device.

In an application scenario of this embodiment of the present invention, the first device is user equipment and the device is a radio access network RAN side device.

Figure 17:
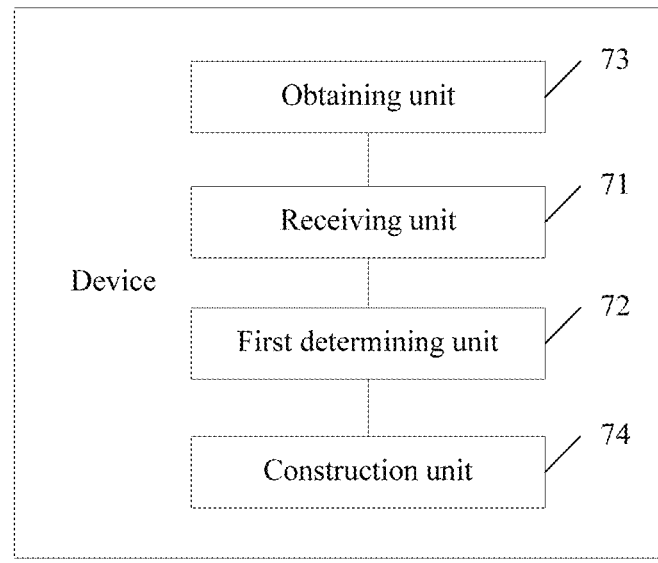
FIG. 17 is a schematic structural diagram of another device according to Embodiment 7 of the present invention.

In this application scenario, as shown in FIG. 17, the device further includes a construction unit 74, where the construction unit 74 is configured to: after the first determining unit 72 determines the sequence number of the TCP-layer data packet corresponding to the link layer data packet successfully received by the first device, construct a TCP-layer ACK according to the sequence number of the TCP-layer data packet successfully received by the first device, where a sequence number of the TCP-layer ACK is a sum of a sequence number of a continuity-acknowledged data packet and a packet length of the continuity-acknowledged data packet, the TCP-layer ACK is used to indicate to an application server that the first device already receives the TCP-layer data packet, and the link layer data packet is obtained by the device after the device encapsulates a TCP layer data packet received from the application server, and the continuity-acknowledged data packet is a TCP-layer data packet having a largest sequence number in consecutive TCP-layer data packets arranged in ascending order of sequence numbers in all TCP-layer data packets that are already determined by the device and that are successfully received by the first device.

Further, in an application scenario of this embodiment of the present invention, the receiving unit 71 is further configured to: before the first determining unit 72 determines, according to the link layer ACK, that the first device already receives the TCP-layer data packet, receive second capability negotiation signaling from the first device, where the second capability negotiation signaling includes a second ACK category and a second interception parameter, a second ACK category includes a first interception category and/or a second interception category, and the second interception parameter includes at least a preset threshold of a receive window carried in a first ACK.

Figure 18:
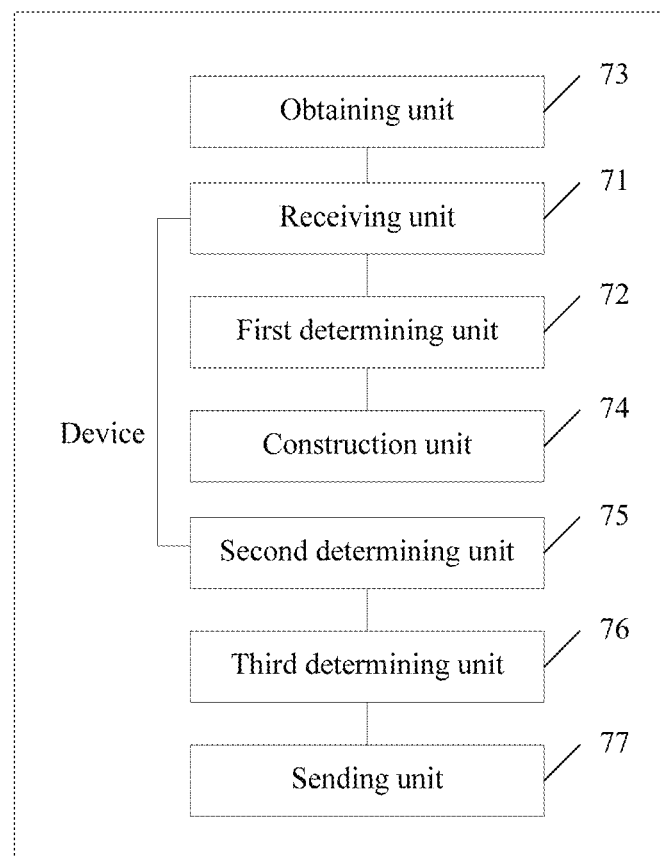
FIG. 18 is a schematic structural diagram of another device according to Embodiment 7 of the present invention.

As shown in FIG. 18, in this application scenario, the device may further include a second determining unit 75, a third determining unit 76, and a sending unit 77, where the second determining unit 75 is configured to: determine an ACK category intersection according to the second ACK category received by the receiving unit 71 and a first interception operation, and determine an interception parameter intersection according to the second interception parameter received by the receiving unit and a first interception parameter, where the first interception operation is operation processing corresponding to the first ACK category, the first ACK category includes the first interception category and/or the second interception category, the ACK category intersection is an intersection of the first ACK category and the second ACK category, the interception parameter intersection is an intersection of the first interception parameter and the second interception parameter, and the first interception parameter includes at least a preset threshold of a receive window carried in the TCP-layer ACK;

the third determining unit 76 is configured to: determine, according to the ACK category intersection determined by the second determining unit 75, a category of ACK interception of which is supported by both the first device and the device, and determine, according to the interception parameter intersection determined by the second determining unit 75, an interception parameter that is supported by both the first device and the device; and the sending unit 77 is configured to send first capability negotiation signaling to the first device, where the first capability negotiation signaling includes the first interception operation and the first interception parameter, where the first capability negotiation signaling is used to instruct the first device to obtain the ACK category intersection and the interception parameter intersection, and to further determine, according to the ACK category intersection, the category of ACK interception of which is supported by both the first device and the device, and determine, according to the interception parameter intersection, the interception parameter that is supported by both the first device and the device.

Further, in another application scenario of this embodiment of the present invention, the sending unit 77 is configured to: before the first determining unit 72 determines, according to the link layer ACK, that the first device already receives the TCP-layer data packet, send first capability negotiation signaling to the first device, where the first capability negotiation signaling includes a first interception operation and a first interception parameter, the first interception operation is operation processing corresponding to a first ACK category, the first ACK category includes a first interception category and/or a second interception category, and the first interception parameter includes at least a preset threshold of a receive window carried in a TCP-layer ACK.

In this application scenario, the device further includes a fourth determining unit, where the fourth determining unit is configured to: determine, according to the first ACK category, a category of ACK interception of which is supported by the device, and determine, according to the first interception parameter, an interception parameter that is supported by the device.

The first capability negotiation signaling is used to instruct the first device to determine, according to the first ACK category, a category of ACK interception of which is supported by the first device, and determine, according to the first interception parameter, an interception parameter that is supported by the first device.

Further, the first device is user equipment and the device is a RAN side device; or the first device is a RAN side device and the device is user equipment.

It should be noted that, for specific descriptions of some function modules in the device provided in this embodiment of the present invention, refer to corresponding content in the method embodiment, and details are not described in this embodiment again.

The device (the second device) provided in this embodiment of the present invention may receive a link layer acknowledgement ACK from a first device, where the link layer ACK is sent by the first device after the first device receives a link layer data packet sent by the device; and determine, according to the link layer ACK, that the first device already receives a TCP-layer data packet.

Compared with the prior art that a large amount of TCP-layer ACK packet transmission occupies radio air interface link resources and increases consumption of radio air interface link resources, in this solution, after the first device intercepts a TCP-layer ACK, the device may determine, according to the link layer ACK sent by the first device, whether the first device successfully receives the TCP-layer data packet. In this way, an acknowledgement mechanism between a data transmit end and a data receive end can still be ensured in a case in which a quantity of TCP-layer ACK packets transmitted on a radio air interface link between the first device and the device is reduced.

Embodiment 8

Figure 19:
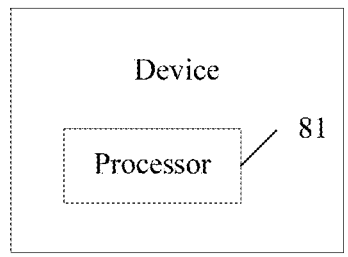
FIG. 19 is a schematic structural diagram of a device according to Embodiment 8 of the present invention.

This embodiment of the present invention provides a device. As shown in FIG. 19, the device includes a processor 81, where the processor 81 is configured to: obtain a Transmission Control Protocol TCP-layer acknowledgement ACK; and intercept the TCP-layer ACK if a TCP-layer data packet corresponding to the TCP-layer ACK is a TCP-layer data packet that is obtained by the device after the device parses a link layer data packet received through a radio air interface link by the device, and the TCP-layer ACK satisfies a preset condition, where that the TCP-layer ACK satisfies the preset condition includes: the TCP-layer ACK does not satisfy at least one filter condition in a first filter criterion, and the TCP-layer ACK belongs to at least one of a first interception category or a second interception category.

Figure 20:
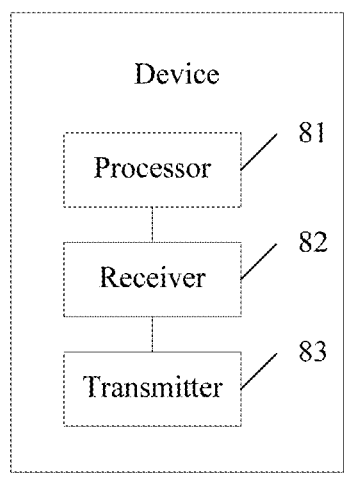
FIG. 20 is a schematic structural diagram of another device according to Embodiment 8 of the present invention.

Further, as shown in FIG. 20, the device further includes: a receiver 82 and a transmitter 83, where the receiver 82 is configured to receive the link layer data packet from a second device through the radio air interface link; and the transmitter 83 is configured to: after the receiver 82 receives the link layer data packet from the second device through the radio air interface link, send a link layer ACK to the second device, so that the second device determines, according to the link layer ACK, that the device already receives the TCP-layer data packet.

Further, the transmitter 83 is further configured to: if the TCP-layer data packet corresponding to the TCP-layer ACK is not the TCP-layer data packet that is obtained by the device after the device parses the link layer data packet received through the radio air interface link by the device, send the TCP-layer ACK to the second device; or the transmitter 83 is further configured to: if the TCP-layer data packet corresponding to the TCP-layer ACK is the TCP-layer data packet that is obtained by the device after the device parses the link layer data packet received through the radio air interface link by the device, and the TCP-layer ACK does not satisfy the preset condition, send the TCP-layer ACK to the second device.

Further, the first filter criterion includes at least: one of the following filter conditions or a combination of multiple filter conditions of the following filter conditions:

the TCP-layer ACK is an ACK that is carried, after the device receives a link layer data packet, another data packet sent to the second device and that is sent to the second device in a delaying manner; the TCP-layer ACK is an ACK in which a SYN bit is not set to 1; the TCP-layer ACK carries a TCP maximum segment size option, a TCP window scale option, and a TCP Sack-permitted option; the TCP-layer ACK carries a TCP option related to the MPTCP protocol; and a receive window carried in the TCP-layer ACK is not less than a preset threshold.

Further, in the first interception category, a TCP-layer data packet corresponding to a sequence number of the TCP-layer ACK is not recorded in a buffer of TCP-layer data packets, and TCP-layer data packets corresponding to ACK sequence numbers before the sequence number of the TCP-layer ACK are all recorded in the buffer of the TCP-layer data packets.

In the second interception category, the sequence number of the TCP-layer ACK is equal to a first sequence number, and the first sequence number is updated once each time after a TCP-layer ACK is obtained but before the obtained TCP-layer ACK is intercepted.

Further, that the TCP-layer ACK satisfies the preset condition further includes: the TCP-layer ACK does not satisfy at least one filter condition in a second filter criterion.

The second filter criterion includes at least: one of the following filter conditions or a combination of multiple filter conditions of the following filter conditions: the TCP-layer ACK carries a TCP timestamps option; or the TCP-layer ACK carries a TCP Sack option.

Further, in an application scenario of this embodiment of the present invention, the receiver 82 is further configured to: before the processor 81 obtains the Transmission Control Protocol TCP-layer acknowledgement ACK, receive first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK;

the processor 81 is further configured to: determine an ACK category intersection according to the first interception operation received by the receiver 82 and a second ACK category, and determine an interception parameter intersection according to the first interception parameter received by the receiver 82 and a second interception parameter, where the ACK category intersection is an intersection of the first ACK category and the second ACK category, the interception parameter intersection is an intersection of the first interception parameter and the second interception parameter, the second ACK category is an ACK category to which a TCP-layer ACK that is intercepted by the first device when the first device makes interception decision belongs, the second ACK category includes the first interception category and/or the second interception category, the second interception parameter is an interception parameter used when the first device makes interception decision, and the second interception parameter includes at least a preset threshold of the receive window carried in the TCP-layer ACK; and determine, according to the ACK category intersection, a category of ACK interception of which is supported by both the first device and the second device, and determine, according to the interception parameter intersection, an interception parameter that is supported by both the first device and the second device; and the transmitter 83 is further configured to send second capability negotiation signaling to the second device, where the second capability negotiation signaling includes the second ACK category and the second interception parameter, where the second capability negotiation signaling is used to instruct the second device to obtain the ACK category intersection and the interception parameter intersection, and to further determine, according to the ACK category intersection, the category of ACK interception of which is supported by both the first device and the second device, and determine, according to the interception parameter intersection, the interception parameter that is supported by both the first device and the second device.

Further, in another application scenario of this embodiment of the present invention, the receiver 82 is further configured to: before the processor 81 obtains the Transmission Control Protocol TCP-layer acknowledgement ACK, receive first capability negotiation signaling from the second device, where the first capability negotiation signaling includes a first interception operation and a first interception parameter, the first interception operation is operation processing corresponding to a first ACK category, the first ACK category includes the first interception category and/or the second interception category, and the first interception parameter includes at least a preset threshold of the receive window carried in the TCP-layer ACK; and the processor 81 is further configured to determine, according to the first interception operation received by the receiver 82, a category of ACK interception of which is supported by the first device, and determine, according to the first interception parameter, an interception parameter that is supported by the first device.

Further, the device is user equipment and the second device is a radio access network RAN side device; or the device is a RAN side device and the second device is user equipment.

The device (the first device) provided in this embodiment of the present invention may obtain a TCP-layer ACK; and intercept the TCP-layer ACK if a TCP-layer data packet corresponding to the TCP-layer ACK is a TCP-layer data packet that is obtained by the device after the device parses a link layer data packet received through a radio air interface link by the device, and the TCP-layer ACK satisfies a preset condition.

Compared with the prior art that a large amount of TCP-layer ACK packet transmission occupies radio air interface link resources and increases consumption of radio air interface link resources, in this solution, the device may perform interception decision on the TCP-layer ACK, and when the corresponding TCP-layer data packet is the TCP-layer data packet that is obtained by the device after the device parses the link layer data packet received through the radio air interface link by the device, and the TCP-layer ACK satisfies the preset condition, intercept the TCP-layer ACK, that is, does not send the TCP-layer ACK to a second device. Therefore, a quantity of TCP-layer ACK packets transmitted on the radio air interface link between the device and the second device can be reduced, thereby reducing consumption of radio air interface link resources, improving transmission efficiency of radio service data, and improving a capacity of a radio communications system.

Embodiment 9

Figure 21:
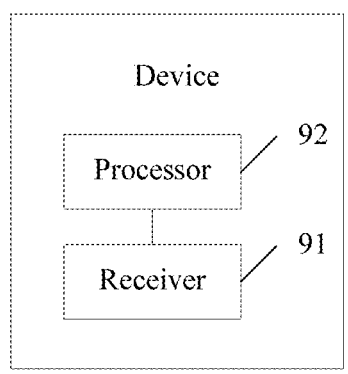
FIG. 21 is a schematic structural diagram of a device according to Embodiment 9 of the present invention.

This embodiment of the present invention provides a device. As shown in FIG. 21, the device includes a receiver 91 and a processor 92, where the receiver 91 is configured to receive a link layer acknowledgement ACK from a first device, where the link layer ACK is sent by the first device after the first device receives a link layer data packet sent by the device; and the processor 92 is configured to determine, according to the link layer ACK received by the receiver 91, that the first device already receives a TCP-layer data packet, where the TCP-layer data packet is obtained by the first device after the first device parses the link layer data packet.

Further, the processor 92 is further configured to: before the receiver 91 receives the link layer ACK from the first device, obtain a mapping relationship between the TCP-layer data packet and the link layer data packet, where the mapping relationship between the TCP-layer data packet and the link layer data packet includes at least: a mapping relationship between a sequence number of the TCP-layer data packet and a sequence number of the link layer data packet.

Further, the link layer ACK includes a sequence number of the link layer data packet corresponding to the link layer ACK; and the processor 92 is further configured to determine, according to the sequence number of the link layer data packet and the mapping relationship between the sequence number of the TCP-layer data packet and the sequence number of the link layer data packet, a sequence number of the TCP-layer data packet corresponding to the link layer data packet successfully received by the first device, where the sequence number of the TCP-layer data packet corresponding to the link layer data packet successfully received by the first device is a sequence number of the TCP-layer data packet successfully received by the first device.

Further, in an application scenario of this embodiment of the present invention, the first device is user equipment and the device is a radio access network RAN side device.

In this application scenario, the processor 92 is further configured to: after determining the sequence number of the TCP-layer data packet corresponding to the link layer data packet successfully received by the first device, construct a TCP-layer ACK according to the sequence number of the TCP-layer data packet successfully received by the first device, where a sequence number of the TCP-layer ACK is a sum of a sequence number of a continuity-acknowledged data packet and a packet length of the continuity-acknowledged data packet, the TCP-layer ACK is used to indicate to an application server that the first device already receives the TCP-layer data packet, and the link layer data packet is obtained by the device after the device encapsulates a TCP layer data packet received from the application server, and the continuity-acknowledged data packet is a TCP-layer data packet having a largest sequence number in consecutive TCP-layer data packets arranged in ascending order of sequence numbers in all TCP-layer data packets that are already determined by the device and that are successfully received by the first device.

Further, in an application scenario of this embodiment of the present invention, the receiver 91 is further configured to: before the processor 92 determines, according to the link layer ACK, that the first device already receives the TCP-layer data packet, receive second capability negotiation signaling from the first device, where the second capability negotiation signaling includes a second ACK category and a second interception parameter, a second ACK category includes a first interception category and/or a second interception category, and the second interception parameter includes at least a preset threshold of a receive window carried in a first ACK; and the processor 92 is further configured to: determine an ACK category intersection according to the second ACK category received by the receiver 91 and a first interception operation, and determine an interception parameter intersection according to the second interception parameter and a first interception parameter, where the first interception operation is operation processing corresponding to the first ACK category, the first ACK category includes the first interception category and/or the second interception category, the ACK category intersection is an intersection of the first ACK category and the second ACK category, the interception parameter intersection is an intersection of the first interception parameter and the second interception parameter, and the first interception parameter includes at least a preset threshold of a receive window carried in the TCP-layer ACK; and determine, according to the ACK category intersection, a category of ACK interception of which is supported by both the first device and the second device, and determine, according to the interception parameter intersection, an interception parameter that is supported by both the first device and the second device.

Figure 22:
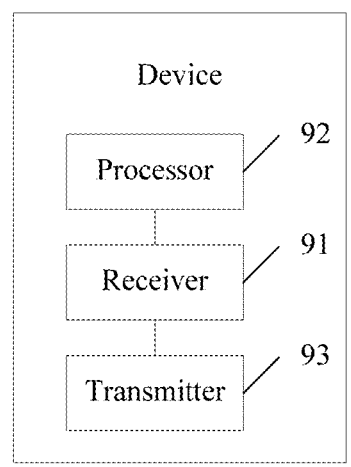
FIG. 22 is a schematic structural diagram of another device according to Embodiment 9 of the present invention.

In this application scenario, as shown in FIG. 22, the device further includes a transmitter 93, where the transmitter 93 is configured to send first capability negotiation signaling to the first device, where the first capability negotiation signaling includes the first interception operation and the first interception parameter, where the first capability negotiation signaling is used to instruct the first device to obtain the ACK category intersection and the interception parameter intersection, and to further determine, according to the ACK category intersection, the category of ACK interception of which is supported by both the first device and the second device, and determine, according to the interception parameter intersection, the interception parameter that is supported by both the first device and the second device.

In another application scenario of this embodiment of the present invention, the transmitter 93 is further configured to: before the processor 92 determines, according to the link layer ACK, that the first device already receives the TCP-layer data packet, send first capability negotiation signaling to the first device, where the first capability negotiation signaling includes a first interception operation and a first interception parameter, the first interception operation is operation processing corresponding to a first ACK category, the first ACK category includes a first interception category and/or a second interception category, and the first interception parameter includes at least a preset threshold of a receive window carried in a TCP-layer ACK; and the processor 92 is further configured to: determine, according to the first ACK category, a category of ACK interception of which is supported by the second device, and determine, according to the first interception parameter, an interception parameter that is supported by the second device, where the first capability negotiation signaling is used to instruct the first device to determine, according to the first ACK category, a category of ACK interception of which is supported by the first device, and determine, according to the first interception parameter, an interception parameter that is supported by the first device.

The device (the second device) provided in this embodiment of the present invention may receive a link layer acknowledgement ACK from a first device, where the link layer ACK is sent by the first device after the first device receives a link layer data packet sent by the device; and determine, according to the link layer ACK, that the first device already receives a TCP-layer data packet.

Compared with the prior art that a large amount of TCP-layer ACK packet transmission occupies radio air interface link resources and increases consumption of radio air interface link resources, in this solution, after the first device intercepts a TCP-layer ACK, the device may determine, according to the link layer ACK sent by the first device, whether the first device successfully receives the TCP-layer data packet. In this way, an acknowledgement mechanism between a data transmit end and a data receive end can still be ensured in a case in which a quantity of TCP-layer ACK packets transmitted on a radio air interface link between the first device and the device is reduced.

Based on the foregoing descriptions of the embodiments, a person skilled in the art may clearly understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, the method comprising:
receiving first capability negotiation signaling from a second device, wherein the first capability negotiation signaling comprises a first interception operation and a first interception parameter, the first interception operation is operation processing corresponding to a first acknowledgement (ACK) category, the first ACK category comprises the first interception category and/or the second interception category, and the first interception parameter comprises at least a preset threshold of the receive window carried in a Transmission Control Protocol (TCP)-layer ACK;
determining an ACK category intersection according to the first interception operation and a second ACK category, and determining an interception parameter intersection according to the first interception parameter and a second interception parameter, wherein the ACK category intersection is an intersection of the first ACK category and the second ACK category, the interception parameter intersection is an intersection of the first interception parameter and the second interception parameter, the second ACK category is an ACK category to which a TCP-layer ACK that is intercepted by the first device when the first device makes interception decision belongs, the second ACK category comprises the first interception category and/or the second interception category, the second interception parameter is an interception parameter used when the first device makes interception decision, and the second interception parameter comprises at least a preset threshold of the receive window carried in the TCP-layer ACK;
determining, according to the ACK category intersection, a category of ACK interception of which is supported by both the first device and the second device, and determining, according to the interception parameter intersection, an interception parameter that is supported by both the first device and the second device;

sending second capability negotiation signaling to the second device, wherein the second capability negotiation signaling comprises the second ACK category and the second interception parameter, wherein
the second capability negotiation signaling is used to instruct the second device to obtain the ACK category intersection and the interception parameter intersection, and to further determine, according to the ACK category intersection, the category of ACK interception of which is supported by both the first device and the second device, and determine, according to the interception parameter intersection, the interception parameter that is supported by both the first device and the second device;
obtaining, by a first device, the TCP-layer acknowledgement (ACK); and
intercepting the TCP-layer ACK when a TCP-layer data packet corresponding to the TCP-layer ACK is a TCP-layer data packet that is obtained by the first device after the first device parses a link layer data packet received through a radio air interface link by the first device, and the TCP-layer ACK satisfies a preset condition, wherein
the TCP-layer ACK satisfying the preset condition comprises:
the TCP-layer ACK does not satisfy a first filter criterion, and the TCP-layer ACK belongs to at least one of a first interception category or a second interception category.

2. The data transmission method according to claim 1, wherein the method further comprises:
after receiving the link layer data packet from the second device through the radio air interface link, sending a link layer ACK to the second device, so that the second device determines, according to the link layer ACK, that the first device already receives the TCP-layer data packet.

3. The data transmission method according to claim 2, wherein the first filter criterion comprises at least:
one of the following filter conditions or a combination of multiple filter conditions of the following filter conditions:
the TCP-layer ACK is an ACK that is carried, after the first device receives the link layer data packet, in another data packet sent to the second device;
the TCP-layer ACK carries a TCP maximum segment size option, a TCP window scale option, and a TCP Sack-permitted option;
the TCP-layer ACK carries a TCP option related to the Multipath Transmission Control Protocol (MPTCP) protocol; and
the TCP-layer ACK carries a TCP timestamps option; and
the TCP-layer ACK carries a TCP Sack option.

4. The data transmission method according to claim 3, wherein:
in the first interception category, a TCP-layer data packet corresponding to a sequence number of the TCP-layer ACK is not recorded in a buffer of TCP-layer data packets, and TCP-layer data packets corresponding to ACK sequence numbers before the sequence number of the TCP-layer ACK are all recorded in the buffer of the TCP-layer data packets; and
in the second interception category, the sequence number of the TCP-layer ACK is equal to a first sequence number, and the first sequence number is updated once each time after a TCP-layer ACK is obtained.

5. The data transmission method according to claim 4, wherein before obtaining the TCP-layer ACK, the method further comprises:

receiving first capability negotiation signaling from the second device, wherein the first capability negotiation signaling comprises a first interception operation and a first interception parameter, the first interception operation is operation processing corresponding to a first ACK category, the first ACK category comprises the first interception category and/or the second interception category, and the first interception parameter comprises at least a preset threshold of the receive window carried in the TCP-layer ACK; and determining, according to the first interception operation, a category of ACK interception of which is supported by the first device, and determining, according to the first interception parameter, an interception parameter that is supported by the first device.

6. The data transmission method according to claim 1, wherein the first device is user equipment and the second device is a radio access network (RAN) side device, or the first device is a RAN side device and the second device is user equipment.

7. A device, comprising:
a receiver, configured to:
receive first capability negotiation signaling from a second device, wherein the first capability negotiation signaling comprises a first interception operation and a first interception parameter, the first interception operation is operation processing corresponding to a first acknowledgement (ACK) category, the first ACK category comprises the first interception category and/or the second interception category, and the first interception parameter comprises at least a preset threshold of the receive window carried in the Transmission Control Protocol (TCP)-layer ACK; and
the processor is configured to:
determine an ACK category intersection according to the first interception operation received by the receiver and a second ACK category, and determine an interception parameter intersection according to the first interception parameter received by the receiver and a second interception parameter, wherein the ACK category intersection is an intersection of the first ACK category and the second ACK category, the interception parameter intersection is an intersection of the first interception parameter and the second interception parameter, the second ACK category is an ACK category to which a TCP-layer ACK that is intercepted by the device when the device makes interception decision belongs, the second ACK category comprises the first interception category and/or the second interception category, the second interception parameter is an interception parameter used when the device makes interception decision, and the second interception parameter comprises at least a preset threshold of the receive window carried in the TCP-layer ACK; and
determine, according to the ACK category intersection determined by the processor, a category of ACK interception of which is supported by both the device and the second device, and determine, according to the interception parameter intersection determined by the processor, an interception parameter that is supported by both the device and the second device; and
receive the TCP-layer ACK;
a sender, configured to:
send second capability negotiation signaling to the second device, wherein the second capability negotiation signaling comprises the second ACK category and the second interception parameter, wherein
the second capability negotiation signaling is used to instruct the second device to obtain the ACK category intersection and the interception parameter intersection, and to further determine, according to the ACK category intersection, the category of ACK interception of which is supported by both the device and the second device, and determine, according to the interception parameter intersection, the interception parameter that is supported by both the device and the second device; and
a processor, configured to intercept the TCP-layer ACK when a TCP-layer data packet corresponding to the TCP-layer ACK obtained by the receiver is a TCP-layer data packet that is obtained by the device after the device parses a link layer data packet received through a radio air interface link by the device, and the TCP-layer ACK satisfies a preset condition, wherein
the TCP-layer ACK satisfying the preset condition comprises:
the TCP-layer ACK does not satisfy at least one filter condition in a first filter criterion, and the TCP-layer ACK belongs to at least one of a first interception category or a second interception category.

8. The device according to claim 7, wherein the receiver is configured to receive the link layer data packet from the second device through the radio air interface link, and wherein the sender is further configured to:
after the receiver receives the link layer data packet from the second device through the radio air interface link, send a link layer ACK to the second device, so that the second device determines, according to the link layer ACK, that the device already receives the TCP-layer data packet.

9. The device according to claim 8, wherein the first filter criterion comprises at least:
one of the following filter conditions or a combination of multiple filter conditions of the following filter conditions:
the TCP-layer ACK is an ACK that is carried, after the device receives a link layer data packet, in another data packet sent to the second device;
the TCP-layer ACK carries a TCP maximum segment size option, a TCP window scale option, and a TCP Sack-permitted option;
the TCP-layer ACK carries a TCP option related to the Multipath Transmission Control Protocol (MPTCP) protocol; and
the TCP-layer ACK carries a TCP timestamps option; and
the TCP-layer ACK carries a TCP Sack option.

10. The device according to claim 9, wherein:
in the first interception category, a TCP-layer data packet corresponding to a sequence number of the TCP-layer ACK is not recorded in a buffer of TCP-layer data packets, and TCP-layer data packets corresponding to ACK sequence numbers before the sequence number of the TCP-layer ACK are all recorded in the buffer of the TCP-layer data packets; and in the second interception category, the sequence number of the TCP-layer ACK is equal to a first sequence number, and the first sequence number is updated once each time after a TCP-layer ACK is obtained.

11. The device according to claim 10, wherein:

before the receiver obtains the TCP-layer ACK, the receiver is configured to:

receive first capability negotiation signaling from the second device, wherein the first capability negotiation signaling comprises a first interception operation and a first interception parameter, the first interception operation is operation processing corresponding to a first ACK category, the first ACK category comprises the first interception category and/or the second interception category, and the first interception parameter comprises at least a preset threshold of the receive window carried in the TCP-layer ACK; and the processor is configured to:

determine, according to the first interception operation received by the receiver, a category of ACK interception of which is supported by the device, and determine, according to the first interception parameter received by the receiver, an interception parameter that is supported by the device.

12. The device according to claim 7, wherein the device is user equipment and the second device is a radio access network (RAN) side device, or the device is a (RAN) side device and the second device is user equipment.

* * * * *